(12) United States Patent
Datta et al.

(10) Patent No.: US 9,997,225 B2
(45) Date of Patent: Jun. 12, 2018

(54) SYSTEM AND METHOD FOR MODULAR SIMULATION OF SPIN TRANSFER TORQUE MAGNETIC RANDOM ACCESS MEMORY DEVICES

(71) Applicant: GLOBALFOUNDRIES Singapore Pte. Ltd., Singapore (SG)

(72) Inventors: Deepanjan Datta, Singapore (SG); Bhagawan Sahu, Watervliet, NY (US); Francis Benistant, Singapore (SG)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 144 days.

(21) Appl. No.: 14/963,264

(22) Filed: Dec. 9, 2015

(65) Prior Publication Data
US 2016/0171135 A1  Jun. 16, 2016

Related U.S. Application Data

(60) Provisional application No. 62/089,863, filed on Dec. 10, 2014.

(51) Int. Cl.
*G06F 17/50* (2006.01)
*G11C 11/16* (2006.01)

(52) U.S. Cl.
CPC ........ *G11C 11/161* (2013.01); *G06F 17/5036* (2013.01); *G06F 2217/16* (2013.01)

(58) Field of Classification Search
CPC .......................... G11C 11/161; G06F 17/5036; G06F 2217/16

(Continued)

(56) References Cited

U.S. PATENT DOCUMENTS

| 8,161,430 B2* | 4/2012 | Jung | G06F 17/5036 |
|---|---|---|---|
| | | | 716/100 |
| 8,423,329 B2* | 4/2013 | Jung | G06F 17/5036 |
| | | | 365/148 |

(Continued)

OTHER PUBLICATIONS

Kerem Yunus Camsari et al., "Four Component Conductance Formulation of Coherent Spin Currents", Mesoscale and Nanoscale Physics, Feb. 2014, arXiv, Cornell University Library.

(Continued)

*Primary Examiner* — Jack Chiang
*Assistant Examiner* — Brandon Bowers
(74) *Attorney, Agent, or Firm* — Horizon IP Pte Ltd.

(57) ABSTRACT

A system and method for simulating behavior of a spin transfer torque magnetic random access memory (STT-MRAM) device includes a hardware processor (HP) and logic instructions (LI) stored in memory. The LI are executed by the HP to configure a library of functional blocks (FBs) to capture physical phenomenon of at least one element of the STT-MRAM configured in the form of a magnetic stack. Selected elements of the stack are mapped into a set of selected FBs (SFBs). The mapping converts the stack to a spin device circuit (SDC) represented by the SFBs. The SFBs are assembled to form the SDC replicating the stack. The SDC includes an electron spin transport, a magnet-dynamics, a magnetic coupling and a coupled electron transport+magnet-dynamics FBs. A set of output parameters simulating the STT-MRAM is generated by the SFBs in response to receiving a set of input parameters.

20 Claims, 23 Drawing Sheets

(58) Field of Classification Search
USPC .......................................................... 716/136
See application file for complete search history.

(56) References Cited

U.S. PATENT DOCUMENTS

| | | | | | |
|---|---|---|---|---|---|
| 8,443,318 | B2* | 5/2013 | Prenat | ................. | G06F 17/5036 365/158 |
| 8,587,993 | B2* | 11/2013 | Lee | ......................... | G11C 11/16 365/157 |
| 9,195,787 | B2* | 11/2015 | Manipatruni | ....... | G06F 17/5036 |

OTHER PUBLICATIONS

Kerem Yunus Camsari et al., "Magnetic Tunnel Junctions Using Spin-circuits", IEEE Electron Devices Meeting Technical Digest (IEDM), 2014, pp. 28-41, IEEE.

Deepanjan Datta et al., "Voltage Asymmetry of Spin-Transfer Torques", IEEE Transactions on Nanotechnology, Mar. 2012, pp. 261-272, vol. 11, No. 2, IEEE.

Kerem Yunus Camsari et al., "Modular Approach to Spintronics", Scientific Reports, 2015, vol. 5, No. 10571, Macmillan Publishers Limited.

Claas Abert et al., "Magnum.fe: A Micromagnetic Finite-element Simulation Code Based on FEniCS", Journal of Magnetism and Magnetic Materials, 2013, pp. 29-35, vol. 345, Elsevier Science B.V., Amsterdam.

Kerem Yunus Camsari et al., "Modular Approach to Spintronics", "https://nanohub.org/groups/spintronics", 2013 HUBzero Foundation, LLC.

Quantum Wise, "Atomistix ToolKit with Virtual NanoLab", "http://quantumwise.com/products/atk", retrieved online on Sep. 28, 2015.

Georg Kresse et al., "VASP the GUIDE", "http://cms.mpi.univie.ac.at/vasp/vasp/vasp.html", Computational Materials Physics, Oct. 2015, Vienna.

Paolo Giannozzi et al., "Quantum Espresso: a Modular and Open-source Software Project for Quantum Simulations of Materials", Journal of Physics Condensed Matter, Sep. 2009, vol. 21, No. 39, IOP Publishing.

Mike Donahue et al., "The Object Oriented MicroMagnetic Framework (OOMMF)", Project at NIST, "http://math.nist.gov/oommf/", Aug. 2006.

Suessco Simulations, "FEMME Software", "http://suessco.com/en/simulations/solutions/femme-software/", retrieved online Sep. 28, 2015.

UCSD Jacobs, "FastMag Micromagnetic Simulator", Computational Electromagnetics, "http://cem.ucsd.edu/index_files/fastmag.html", Department of Electrical and Computer Engineering, University of California, San Diego.

Deepanjan Datta, "Modeling of Spin Transport in MTJ Devices", Engineering, Electronics and Electrical Nanoscience, May 2013, vol. 74, No. 7, Purdue University.

Samiran Ganguly et al., "Magnetic Tunnel Junction Lab", NEEDS: Nano-Engineered Electronic Device Simulation Node, Apr. 2014, "https://nanohub.org/resources/mtjlab".

* cited by examiner

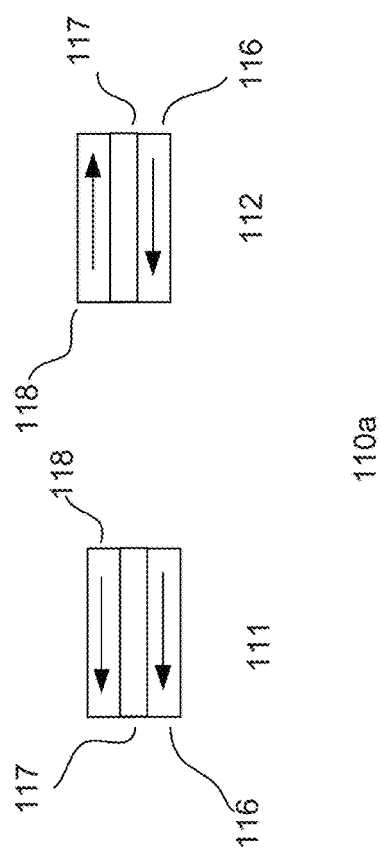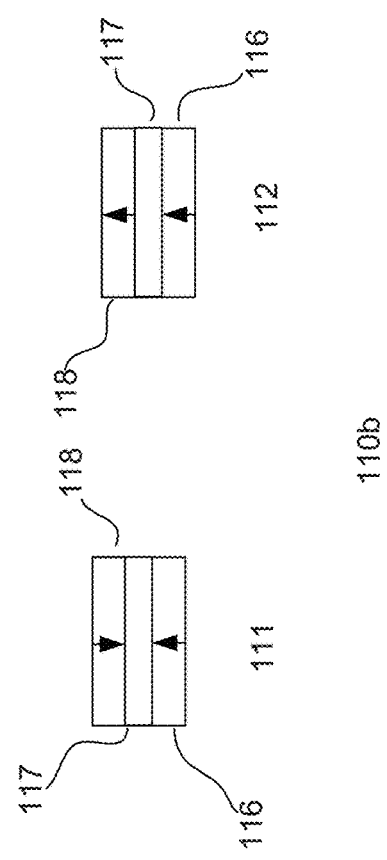

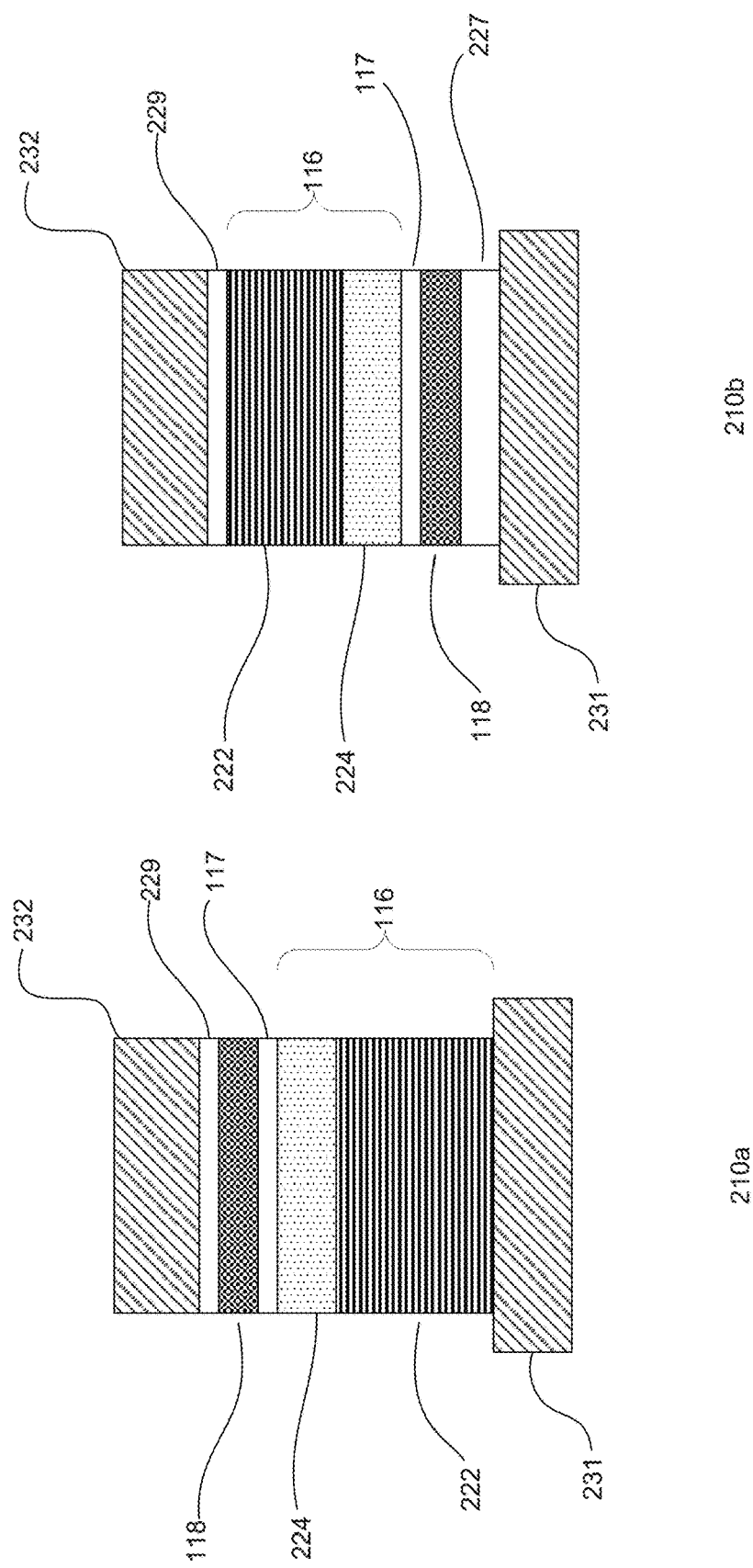

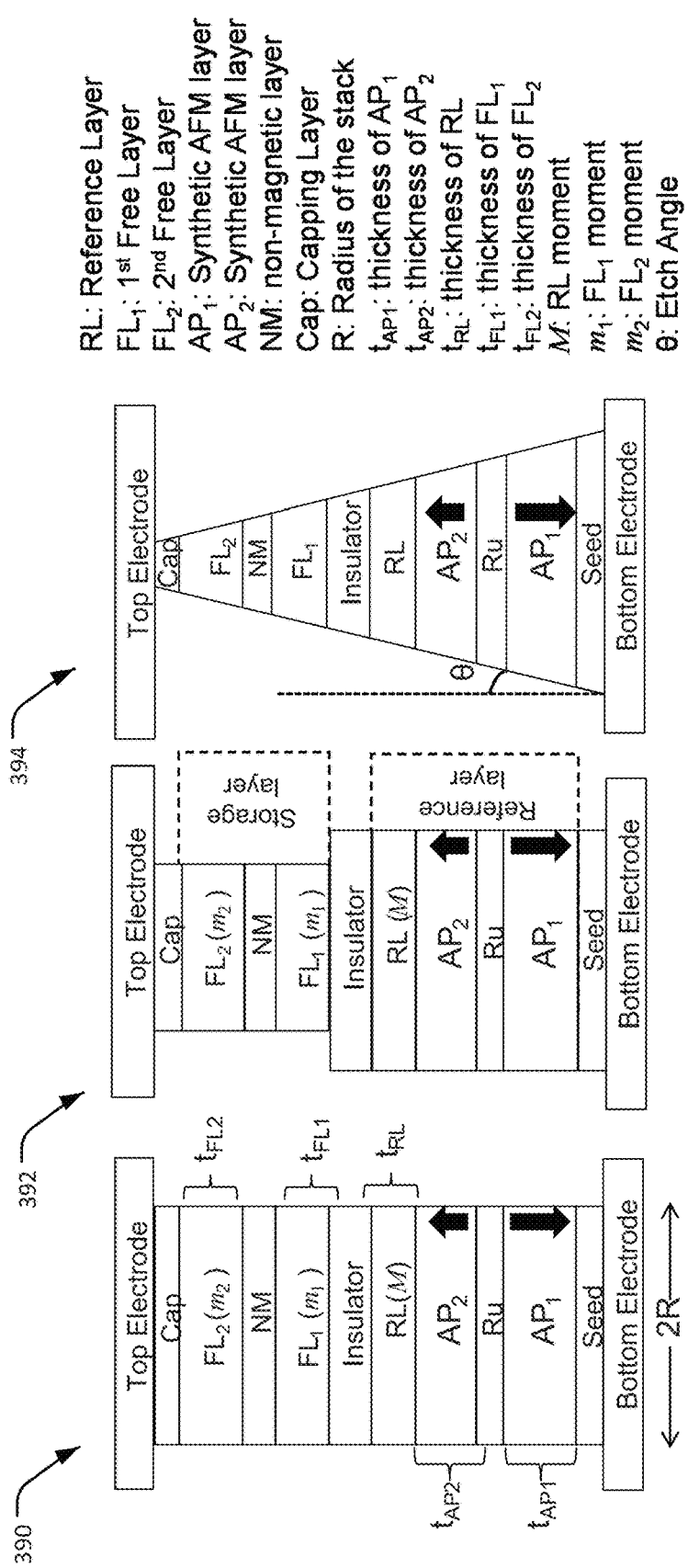

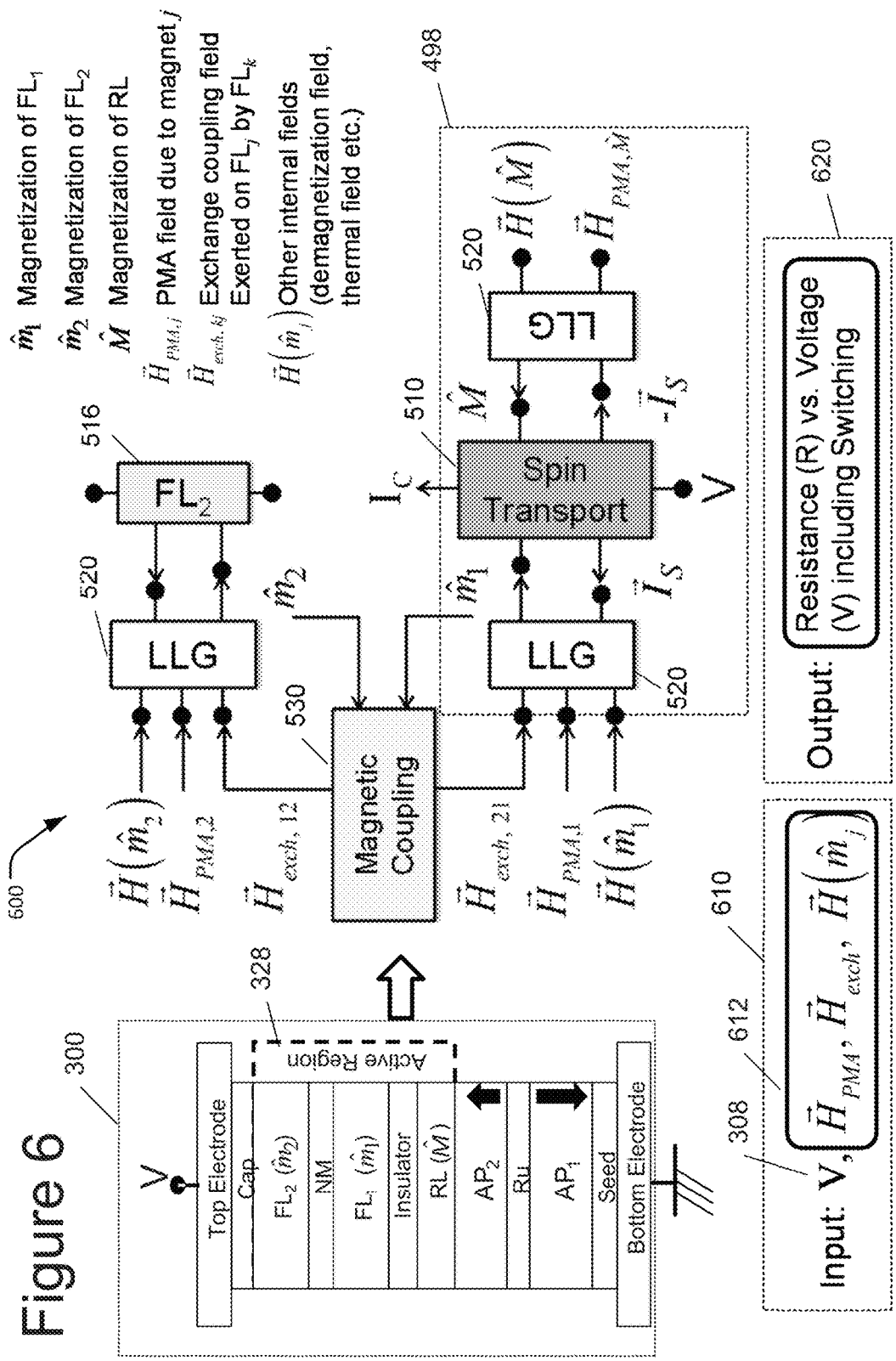

$$[G_{pq}] = \begin{bmatrix} * & * & * & * \\ * & * & * & * \\ * & * & * & * \\ * & * & * & * \end{bmatrix} \begin{matrix} c \\ \hat{z} \\ \hat{x} \\ \hat{y} \end{matrix}$$

$$\begin{matrix} c & \hat{z} & \hat{x} & \hat{y} \end{matrix}$$

$$[I]_{4\times1} = [G]_{4\times4} * [V]_{4\times1}$$

4- component V, I $$\begin{bmatrix} V_c \\ \overline{V}_s \end{bmatrix}, \begin{bmatrix} I_c \\ \overline{I}_s \end{bmatrix} \begin{matrix} \text{Charge} \\ \text{Spin} \end{matrix}$$

Figure 7a

SYSTEM AND METHOD FOR MODULAR SIMULATION OF SPIN TRANSFER TORQUE MAGNETIC RANDOM ACCESS MEMORY DEVICES

CROSS-REFERENCE TO RELATED APPLICATION

This application claims the benefit of and priority to U.S. Provisional Patent Application No. 62/089,863, filed Dec. 10, 2014, which is hereby incorporated by reference in its entirety.

BACKGROUND

Spin Transfer Torque Magnetic Random Access Memory (STT-MRAM) devices that can switch magnetization of a ferromagnetic layer using spin polarized electrons have generated much interest due to their ability to write information without any external magnetic fields. In one such STT-MRAM device, spin information is stored by changing magnetization of a ferromagnetic layer that results in change in the electrical resistance of a magnetic tunnel junction (MTJ) device. A MTJ device typically includes a tunneling oxide layer sandwiched between a reference (or, pinned) magnetic layer and a free magnetic layer. A MTJ device can be classified into two categories depending on the direction of magnetization of the individual magnetic elements: (a) In-plane MTJ (or, planar MTJ) with natural magnetization of individual magnetic layer in the easy-plane of the magnets and (b) Perpendicular MTJ (p-MTJ) with natural magnetization of individual magnetic layers in a direction perpendicular to the easy-plane of the magnets. There is an increased interest in the development of p-MTJ devices for use in high-density, non-volatile memory and logic chips that provide a low switching current, and other desirable properties compared to the planar MTJ structures.

Chip designers have relied on simulation tools such as MATLAB, SPICE and Verilog-A models to analyze and evaluate the effects of changing various design parameters to optimize chip performance. However, it has been a challenging task to model a STT-MRAM device such as a p-MTJ device that truly replicates its complex set of physical properties.

From the foregoing discussion, it is desirable to provide systems and methods to simulate behavior of a STT-MRAM device using well-known simulation tools with improved fidelity.

SUMMARY

Embodiments of the present disclosure generally relate to magnetic devices. More particularly, some embodiments relate to memory devices, such as magnetic memory devices. For example, the magnetic memory devices may be spin transfer torque magnetic random access memory (STT-MRAM) devices. Such memory devices, for example, may be incorporated into standalone as well as embedded memory devices including, but not limited to, USB, or, other types of portable storage units or, ICs, such as microcontrollers (eFlash) or, Multi-core (eDRAM) or, system on chips (SOCs) or, MPUs. Such memory devices are highly scalable and versatile, allowing embedded STT-MRAM to dominate over multiple embedded memory types, such as Flash, DRAM, and/or SRAM through bit cell design optimization. The devices or ICs may be incorporated into or used with, for example, portable consumer electronic products, or relate to other types of devices and are useful for applications such as (i) Enterprise SDD, (ii) Internet of Things (IOT), (iii) Aerospace, (iv) automotive and (v) medical applications.

In one embodiment, a system and method for simulating behavior of a STT-MRAM device is disclosed. The system includes a hardware processor and logic instructions stored on memory storage media. The logic instructions are executable by the hardware processor to configure a library of functional blocks (FBs) to capture physical phenomenon of at least one element of the STT-MRAM device configured in the form of a stack. Selected elements of the stack are mapped into a set of selected physics based functional blocks (FBs). The mapping maps the stack to a spin device circuit (SDC) represented by the FBs. The FBs are assembled to form the SDC to replicate the stack. The SDC includes an electron spin transport FB, a magnet-dynamics FB, a magnetic coupling FB and a coupled Transport+Magnet-dynamics FB. A set of output parameters simulating the STT-MRAM device is generated by the FBs in response to receiving a set of input parameters. Starting right at the material and phenomena level of abstraction, the disclosure provides a quantitative machinery to explore STT-MRAM device.

In another embodiment, a method of simulating behavior of a spin transfer torque magnetic random access memory (STT-MRAM) device is presented. The method includes configuring a library of functional blocks, where each functional block in the library of functional blocks is configured to generate a set of output parameters in response to receiving a set of input parameters. Each functional block in the library of functional blocks is configured to capture physical phenomenon associated with at least one element of the STT-MRAM device that has a configurable physical structure configured in the form of a stack. Selected elements of the STT-MRAM device are mapped into a corresponding set of selected functional blocks. The selected elements include the stack. The mapping maps the stack to a spin device circuit represented by the selected functional blocks. The selected functional blocks are assembled in a configurable manner to form the spin device circuit, where the configurable manner replicates the physical structure of the STT-MRAM device. The spin device circuit for the stack includes an electron spin transport functional block, a magnet-dynamics functional block, a magnetic coupling functional block and a coupled inter-layer Transport+Magnet-Dynamics (TMD) functional block. The set of output parameters representing the behavior of the STT-MRAM device is generated in response to receiving the set of input parameters.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are incorporated in and form part of the specification in which like numerals designate like parts, illustrate preferred embodiments of the present disclosure and, together with the description, serve to explain the principles of various embodiments of the present disclosure.

FIGS. 1a-1b show diagrams of parallel (P) state and antiparallel (AP) state of a MTJ element.

FIGS. 2a-2b show cross-sectional views of embodiments of MTJ elements.

FIGS. 3b-3d illustrate cross-sectional view of various embodiments of a memory cell.

FIG. 6 shows a spin device circuit diagram representing an active region of a stack of a STT-MRAM device.

FIG. 7a shows a conductance matrix based modeling approach to implement spin device circuits.

FIG. 8d shows an exemplary iterative process flow diagram to verify, validate and improve the spin circuit model for a STT-MRAM cell described with reference to FIG. 8a.

DETAILED DESCRIPTION

Figure 3A:
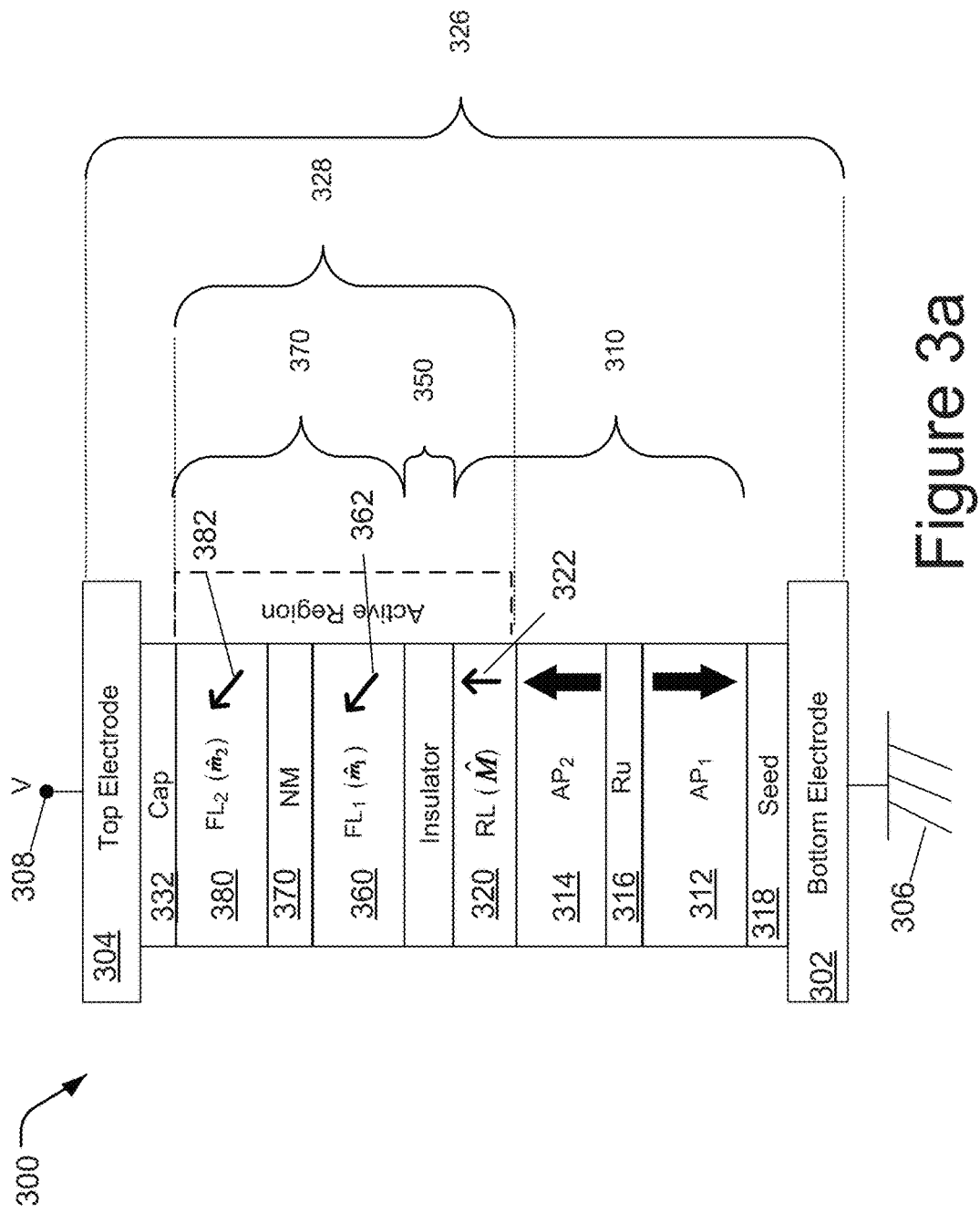
FIG. 3a shows an isometric cross-sectional view of an embodiment of a memory cell.

Embodiments of the present disclosure generally relate to memory cells. In one embodiment, the memory cells are magnetic resistive memory cells. Magnetic resistive memory cells include magnetic tunneling junction (MTJ) elements. Other suitable types of resistive memory cells may also be useful. The memory cells are configured to produce fast write time and high sensing margin. The memory cells can be incorporated into or used with, for example, electronic products such as mobile phones, smart card, mass storage, computer memory, enterprise storage and industrial and automotive products.

The following terminology may be useful in understanding the present disclosure. It is to be understood that the terminology described herein is for the purpose of description and should not be regarded as limiting.

Framework—A basic structure designed to provide one or more functions. A framework used in a computer hardware and software environment may be typically designed to include processes to deliver core functions and extensible functions. The core functions are typically a portion of the framework that may not be modifiable by the framework user. The extensible functions are typically a portion of the framework that has been explicitly designed to be customized and extended by the framework user as a part of the configuration and implementation process. For example, nudged elastic band (NEB) is a framework for finding saddle points and minimum energy paths between the initial and final states for any physical or chemical process.

Architecture—Defines the fundamental organization of a system, embodied in its components, their relationships to each other and the environment, and the principles governing its design and evolution.

Simulation—An imitation or enactment of the operation of a process, product, device or system over time. Performing a simulation typically requires development of a high-fidelity model that represents the key characteristics, properties, attributes, behaviors or functions of the selected process, product, device or system. Typically, the high-fidelity model may be configured and executed as a program on a computer system to generate a set of outputs from a given set of inputs. For example, Berkeley Short-channel IGFET Model (BSIM) is a Spice/Verilog based high fidelity model for simulating MOSFET devices across technology nodes.

System—One or more interdependent elements, components, modules, functions, blocks, or devices that co-operate to perform one or more predefined functions.

Configuration—Describes a setup of elements, components, modules, devices, and/or a system, and refers to a process for setting, defining, or selecting hardware and/or software properties, parameters, or attributes associated with the elements, components, modules, devices, functions and/or the system.

FIG. 1a shows a simplified cross-sectional view of an embodiment of a MTJ element 110a. As shown, the magnetization, magnetization direction, magnetization vector, or magnetic orientations of the magnetic element is planar configuration. Planar configuration, for example, refers to the direction along or parallel to the plane containing the magnetization of a magnet. A MTJ element includes a reference magnetic layer 116, a tunneling barrier layer 117 and a free magnetic layer 118. The magnetic orientation of the reference layer is designed to be fixed while the magnetic orientation of the free layer may be programmed to be in a first or same direction as the reference layer or in a second or opposite direction as the reference layer. For example, as shown by structure 111, the magnetic direction of the free layer is programmed to be in the first or parallel direction as the reference layer. The corresponding MTJ electrical resistance between the free layer 118 and the reference layer 116 is denoted as a parallel resistance denoted by RP. Structure 112 illustrates that the magnetization of the free layer is programmed to be in a second or anti-parallel direction as the reference layer. The corresponding MTJ electrical resistance between the free layer 118 and the fixed layer 116 is denoted as an antiparallel resistance denoted by $R_{AP}$. The antiparallel resistance $R_{AP}$ is higher than the parallel resistance $R_P$. Tunnel-magnetoresistance (TMR) is calculated using the formula given by $(R_{AP}-R_P)/R_P$.

FIG. 1b shows perpendicular alignment of magnetic orientations in the magnetic layers of a MTJ element 110b. Perpendicular, for example, refers to the direction perpendicular to the plane containing the magnetization of a magnet. As shown in FIG. 1b, MTJ element 110b includes a reference layer 116, a tunneling barrier layer 117 and a free layer 118. When MTJ element 110b is in a magnetic antiparallel state, magnetic orientations of the free layer 118 and the reference layer 116 are in opposite directions as shown by structure 111. The corresponding MTJ electrical resistance between the free layer 118 and the reference layer 116 is denoted as $R_{AP}$. When MTJ element 110b is in a magnetic parallel state, magnetic orientations of the free layer 118 and the reference layer 116 are in the same direction as shown by structure 112. The corresponding MTJ electrical resistance between the free layer 118 and the reference layer 116 is denoted as RP.

FIGS. 2a-2b show cross-sectional views of exemplary embodiments of MTJ stacks or elements. FIG. 2a shows a bottom-pinned MTJ element 210a and FIG. 2b shows a top-pinned MTJ element 210b. Top and bottom refer to position of layers relative to the substrate surface.

As shown in FIG. 2a, bottom-pinned MTJ stack 210a includes a bottom electrode 231, a reference magnetic layer 116, a tunneling barrier layer 117, a free magnetic layer 118, a cap layer 229 and a top electrode layer 232 on the cap layer 229. The reference layer 116, in one embodiment, includes a magnetic layer 224 and a pinning layer 222 on the bottom electrode 231. The pinning layer, for example, pins the magnetization direction of the corresponding magnetic layer, thereby forming a pinned layer.

The free layer may be CoFeB, the tunneling barrier layer may be MgO or $Al_2O_3$, and the reference layer may be CoFeB/X/Ru/X, where X can be CoNi, NiFe, FePt (for p-MTJ) or, PtMn or, IrMn (for planar MTJ) with CoFeB being the magnetic layer and X/Ru/X being the pinning layer. The top and bottom electrodes may be TaN or Ta. Other suitable configurations or materials for the MTJ stack may also be useful.

As shown in FIG. 2b, top-pinned MTJ stack 210b includes a bottom electrode 231, a buffer layer 227, a free layer 118, a tunneling barrier layer 117, a reference layer 116, a cap layer 229 and a top electrode layer 232 on the cap layer 229. The reference layer 116, in one embodiment, includes a magnetic layer 224 and a pinning layer 222. The pinning layer, for example, pins the magnetization direction of the corresponding magnetic layer, thereby forming a pinned layer.

The free layer may be CoFeB, the tunneling barrier layer may be MgO or $Al_2O_3$, and the reference layer may be CoFeB/X/Ru/X, where X can be CoNi, NiFe, FePt or, PtMn or, IrMn, with CoFeB being the magnetic layer and X/Ru/X being the pinning layer. The top and bottom electrodes may be TaN or Ta and the buffer layer may be Ru. The buffer layer, for example, serves to prevent diffusion of the material of the bottom electrode into the tunneling barrier layer. Other suitable configurations or materials for the MTJ stack may also be useful.

FIG. 3a shows a cross sectional view of an embodiment of a memory cell 300. The memory cell is a non-volatile memory cell. For example, the memory cell may be a magnetic memory cell. In one embodiment, the memory cell is a Spin Transfer Torque Magnetic Random Access Memory (STT-MRAM) cell. Other suitable types of memory cells may also be useful. In an embodiment, portions of the memory cell 300 may be implemented using MTJ elements described with reference to FIGS. 1a, 1b, 2a and 2b.

In the depicted embodiment, a cartoon of the memory cell 300 is shown as a p-MTJ device having an insulator layer 350 sandwiched between multiple (or composite) reference or pinned magnetization layers 310 and multiple (or composite) free magnetization layers 370, the multiple layers being structured in the form of a multi-layered stack 326. Various elements of the STT-MRAM memory cell 300 described with reference to FIG. 3a may include geometry of the multi-layered stack 326, sequence and type of materials used for each layer, value of voltage V 308, and others.

The multiple reference or pinned magnetization layers 310, which may also be referred to as the reference magnetic layer, may be configured to include $AP_1$ 312, Ru 316, $AP_2$ 314 and RL 320 layers. The multiple free magnetization layers 370 may be configured to include $FL_1$ 360, NM 370 and $FL_2$ 380 layers. The memory cell 300 is configured to include at least two terminals, a bottom electrode 302 and a top electrode 304. In an embodiment, the bottom electrode 302 may be coupled to a ground reference 306 and the top electrode 304 may be coupled to a voltage source V 308. The top and bottom electrodes 304, 302 may include conductive materials such as tantalum (Ta), platinum (Pt), copper (Cu), gold (Au), aluminum (Al), or similar conductive materials.

All of the Ferromagnetic (FM) layers (e.g., the multiple free magnetization layers 370) have their magnetizations along a direction perpendicular to the plane containing the magnets. Perpendicular magnetic anisotropy (PMA) arises at the interface between ferromagnetic material and oxides. A p-MTJ device structure may employ the PMA of the $NM/FL_1$/MgO interface for electron transfer. The pinned layers of the p-MTJ may be formed using synthetic antiferromagnetic (SAF) layers. The SAF layers may be used as a reference layer to minimize dipolar interactions induced between this layer and the multiple free magnetization layers 370. The SAF layers of a p-MTJ may be formed from a multilayer stack of cobalt/platinum (Co/Pt) or cobalt/nickel (Co/Ni). Other suitable materials may also be used for the SAF layers. In an embodiment, the multiple reference or pinned magnetization layers 310 may include a single reference magnetic layer.

In the depicted embodiment, the multiple reference or pinned magnetization layers 310 are configured to include a synthetic antiferromagnetic (SAF) layer having an $AP_1$ 312 layer and an $AP_2$ 314 layer that are separated by a non-magnetic spacer (e.g., ruthenium (Ru) 316) layer required for antiferromagnetic coupling. Other materials such as tantalum (Ta), gadolinium (Gd), platinum (Pt), hafnium (Hf), osmium (Os), rhodium (Rh), niobium (Nb). Terbium (Tb), or similar others may also be useful for antiferromagnetic coupling.

In an embodiment, the $AP_1$ 312, $AP_2$ 314 SAF layers may include ferromagnetic materials including iron (Fe) in combination with other materials such as nickel (Ni), platinum (Pt), or palladium (Pd), or similar other ferromagnetic materials. A bottom seed layer 318 may be formed on the bottom electrode 302 to provide a mechanical and crystalline substrate for the $AP_1$ 312 SAF layer. The bottom seed layer 318 may include compound materials such as nickel chromium (NiCr), nickel iron (NiFe), NiFeCr, or similar other materials.

A reference layer (RL) 320 is formed on the $AP_2$ 314 SAF layer. The RL 320 layer provides a crystalline orientation for the insulator layer 350. In an embodiment, the RL 320 layer has a magnetization vector M̂ 322. Direction of the magnetization vector M̂ 322 may be configured to be perpendicular to the plane containing the RL 320 magnets. The insulator layer 350 provides a tunnel barrier for electrons tunneling between the reference layer (RL) 320 and the first free magnetic layer $FL_1$ 360 (the active layer or the storage layer). A thickness of the insulator layer 350 may be configured to enable electrons to tunnel through from the reference layer (RL) 320 to the first free magnetic layer $FL_1$ when a biasing voltage V 308 is applied across the memory cell 300. In an embodiment, the insulator layer 350 may be configured to have a thickness approximately between 1 nm to 3 nm. Other thickness dimensions greater than 3 nm may also be useful.

In an embodiment, the insulator layer 350 may include magnesium oxide (MgO) and may have a crystalline structure. Other non-magnetic or dielectric materials such as aluminum oxide (AlO), aluminum nitride (AlN), aluminum oxynitride (AlON) may also be useful. Other structures (not shown) of the multiple reference or pinned magnetization layers 310 may also be useful. For example, a spacer layer may be sandwiched between the $AP_2$ 314 SAF layer and the RL 320 layer. Material for the spacer layer may include Tantalum (Ta), Molybdenum (Mo) or similar others.

In the depicted embodiment, the RL 320 layer, the insulator layer 350, and the multiple free magnetization layers 370 may be referred to as an active region 328 of the memory cell 300. In the depicted embodiment, the multiple free magnetization layers 370 may include the non-magnetic layer NM 370 being sandwiched between the first free layer $FL_1$ 360 and the second free layer $FL_2$ 380. Insertion of NM 370 in the free composite layer may contribute to improved thermal stability via combined interface and bulk magnetic anisotropies, lower critical current density, and fast switching time compared to the free composite layer without NM 370 insertion. Spin transport phenomenon occurs between RL 320/insulator layer 350/$FL_1$ 360 layers where current through RL 320 and spin-filtering through the insulator layer 350 influence a magnetization vector $m_1\hat{}$ 362 of the $FL_1$ 360 layer. This change is felt by $FL_2$ 380 magnetization vector $m_2\hat{}$ 382 via exchange coupling (due to NM 370) and the magnetization vector $m_2\hat{}$ 382 of $FL_2$ 380 in turn influences $FL_1$ 360 magnetization $m_1\hat{}$ 362 due to magnet-dynamics phenomenon.

In the depicted embodiment, a dielectric or insulating top cap layer 332 may be sandwiched between the $FL_2$ 380 layer and the top electrode 304 to provide containment of magnetic and electric fields between the multiple reference or pinned magnetization layers 310 and the multiple free magnetization layers 370. In a p-MTJ device, the different magnetization states of the free layer $FL_2$ 380 may be used to represent/store either a logic "1" or a logic "0". In particular, the electrical resistance R of the p-MTJ depends on whether the free layer $FL_1$ 360 magnetization $m_1\hat{}$ 362 and the RL 320 layer magnetization $M\hat{}$ are parallel or antiparallel with each other.

FIGS. 3b, 3c and 3d show cross sectional views of a memory cell 390, 392 and 394 respectively. The memory cells 390, 392 and 394 are substantially similar to the memory cell 300 described with reference to FIG. 3a except for geometry of the multi-layered stack 326. For example, memory cell 394 has an etch angle of θ compared to vertically stacked layers of memory cells 390 and 392. In addition, widths of each layer may vary for the different multi-layered stacks.

Figure 4A:
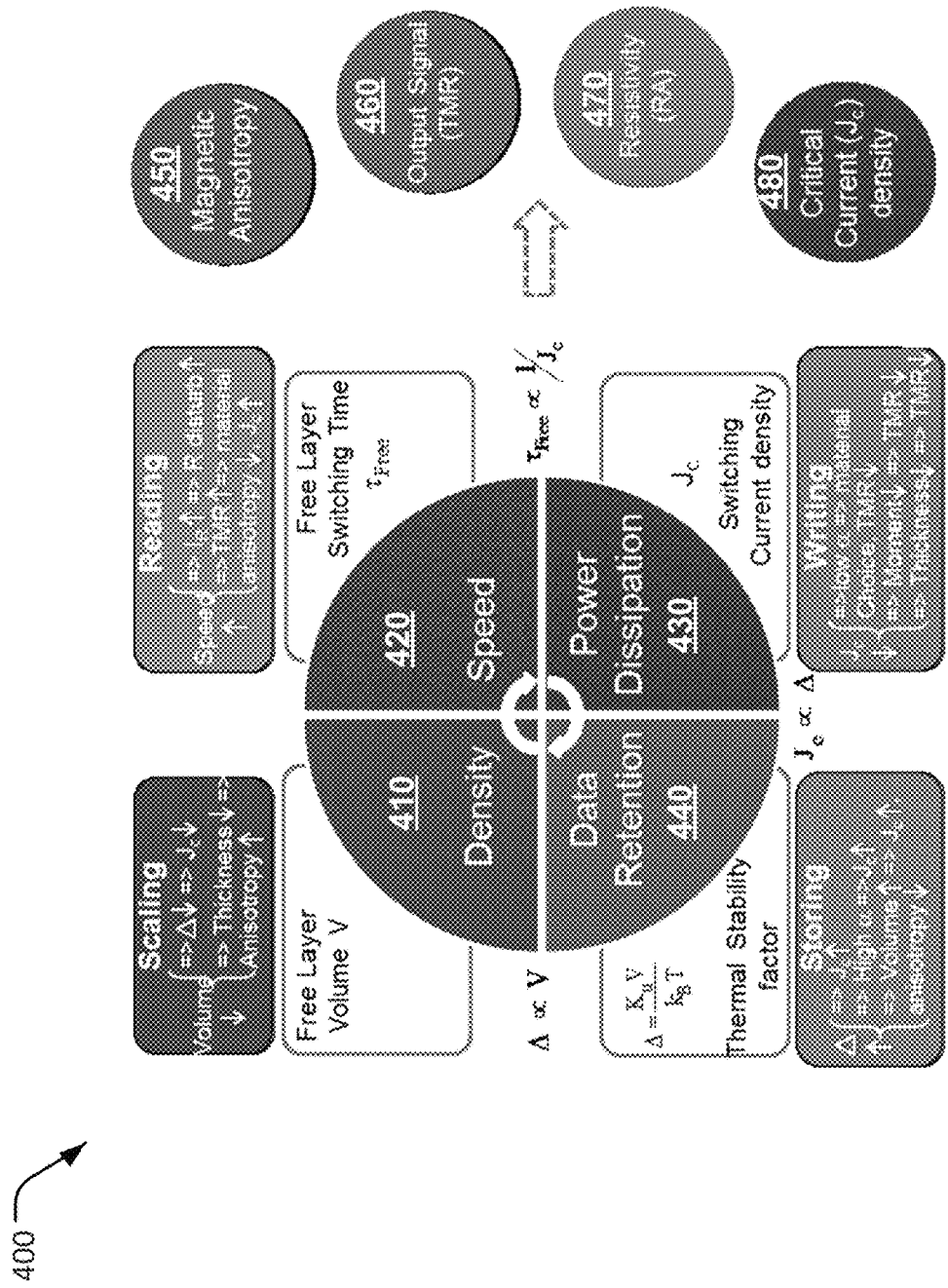
FIG. 4a shows a block diagram illustrating a process to select a set of configurable design parameters that affect behavior of a STT-MRAM device.
Figure 4B:
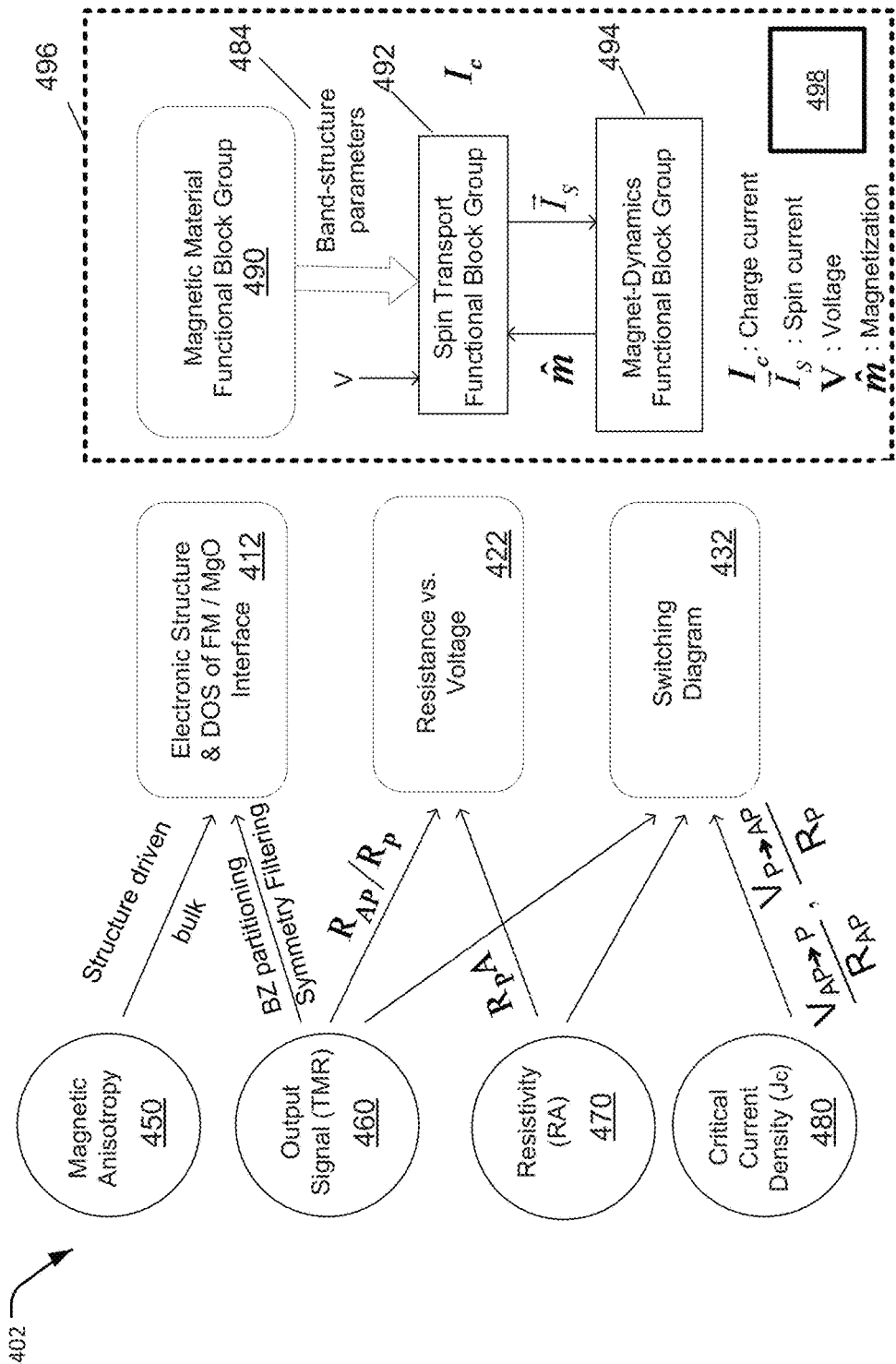
FIG. 4b shows a block diagram illustrating use of a simulation framework to optimize configurable design parameters of a STT-MRAM device.

FIG. 4a shows a block diagram illustrating a process 400 to select a set of configurable design parameters that affect behavior of STT-MRAM device 300. FIG. 4b shows a block diagram illustrating use of a simulation framework 402 to optimize the configurable design parameters of STT-MRAM device 300. Referring to FIGS. 4a and 4b, depending on the application requirements, behavior and performance of a p-MTJ device may be optimized using a simulation framework 402, tools and techniques described herein. Device characteristics such as density 410, switching speed 420, power dissipation 430 and data retention 440 may be configured by selecting a set of configurable design parameters that affect the behavior of STT-MRAM device 300. In an embodiment, the set of configurable design parameters may include magnetic anisotropy 450, output signal (TMR) 460, resistivity (RA) 470 and critical current density (Jc) 480. Use of the simulation framework 402, tools and techniques described herein offer quantifiable design tradeoffs and balancing of opposing design parameters to optimize the behavior and performance of the MRAM device 300. For example, critical current density Jc 480 may be decreased to reduce power dissipation 430. However, reduction in Jc 480 may negatively impact output signal (TMR) 460 and decrease thermal stability of the free magnetic layer resulting in lower data retention 440. As another example, speed 420 may be increased by reducing free layer switching time and increasing Jc 480, which may negatively impact power dissipation 430. Additional details of a computer system that may be used to implement the simulation framework 402 is described with reference to FIG. 10.

Referring to FIG. 4b, in the depicted embodiment, in order to study the set of configurable design parameters including magnetic anisotropy 450, output signal (TMR) 460, resistivity (RA) 470 and critical current density (Jc) 480; we need to calculate a set of configurable performance criteria of the STT-MRAM device 300 such as electronic (or atomistic) structure and density-of-states (DOS) of ferromagnet (FM)/insulator interface 412, resistance versus voltage graphs 422 and switching diagrams 432. For example, a change in the electronics structure and DOS of FM/insulator interface 412 has a direct effect on interface spin polarization that results in change in output signal (TMR) 460 as well as interfacial magnetic anisotropy 450. In an embodiment, the simulation framework 402 may include a magnetic material functional block group 490, a spin transport functional block group 492 and a magnet-dynamics functional block group 494. The magnetic material functional block group 490, the spin transport functional block group 492 and the magnet-dynamics functional block group 494 are part of a library of functional blocks 496. The functional block groups 490, 492, 494 may include additional functional blocks. Each functional block, which may also be referred to as a module, an elemental function or simply as a block, may be configured to be executed, parsed or processed thereby generating a set of output parameters in response to receiving a set of input parameters. Additional details of the functional block groups 490, 492, 494 and the library of functions blocks 496 are described with reference to FIG. 5.

Figure 5:
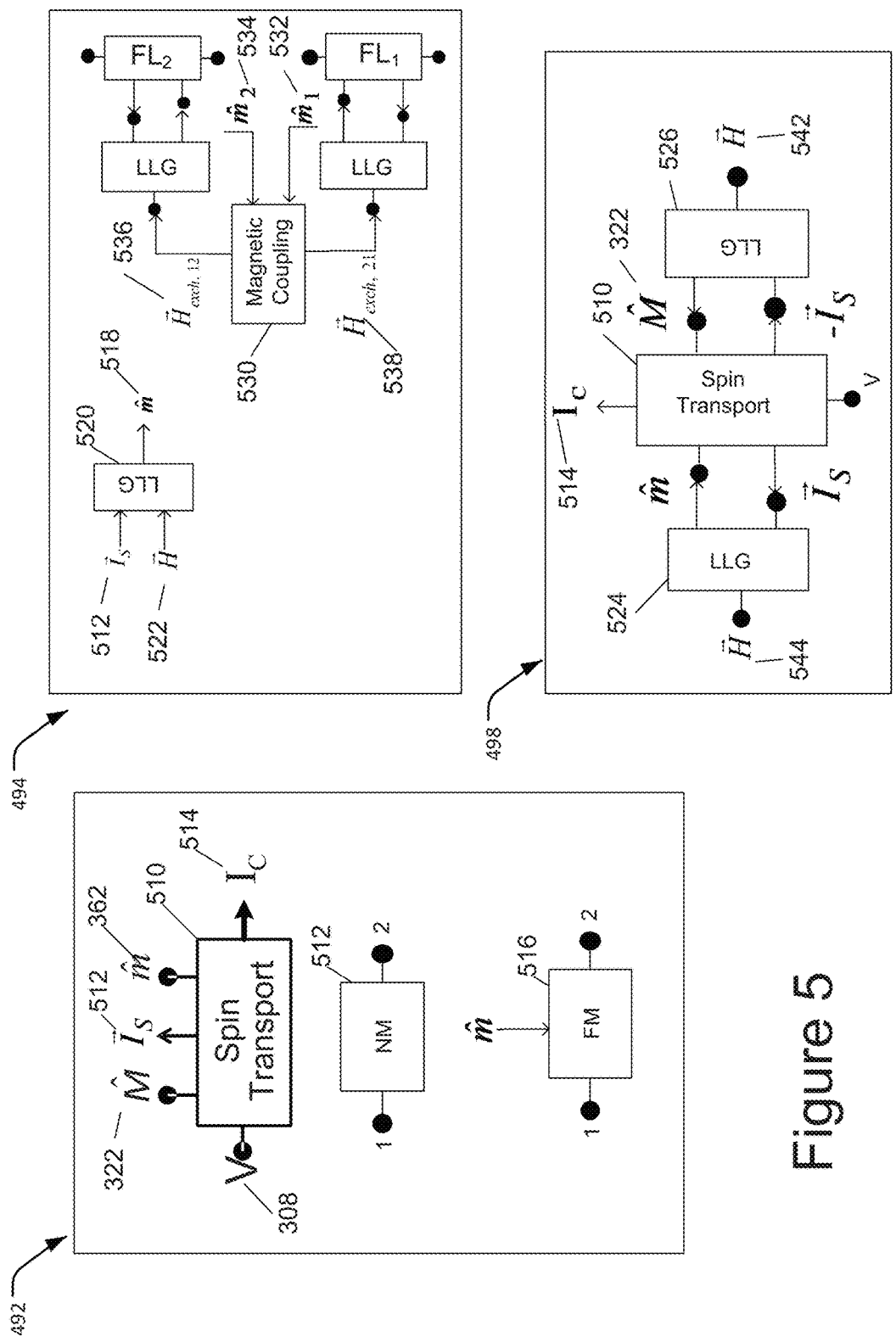
FIG. 5 shows a library of functional blocks configured to capture behavior of one or more physical phenomenon associated with one or more elements of a STT-MRAM device.

FIG. 5 shows a library of functional blocks 496 configured to capture behavior of one or more physical phenomenon associated with one or more elements of the STT-MRAM device 300. Referring to FIGS. 4b and 5, the magnetic material functional block group 490 may include one or more functional blocks (not shown) that generate band-structure parameters 484 as output based on the electronic (or atomistic) structure 412 and density of states (DOS) of free layer/insulator interface as inputs. The band-structure parameters 484 may be used as inputs by the spin transport functional block group 492. The library of functional blocks 496 may be grouped under the following categories: 1) the spin transport functional block group 492 based on the physics of transport, 2) the magnet-dynamics functional block group 494 based on the physics of magnetism, and 3) a coupled Spin Transport+Magnet-Dynamics (TMD) functional block 498. In the depicted embodiment, the spin transport functional block group 492 may include an electron spin transport block 510 used for spin tunneling transport, a non-magnet block 512, and a ferromagnet block 516 used for spin diffusive transport. Other types of functional blocks (not shown) like Rashba Spin Orbit (RSO)

coupling, Giant Spin Hall Effect (GSHE) or insulator may also be useful. It is contemplated that the library of functional blocks 496 is extensible to include new functional blocks or modify/improve existing functional blocks to model new spintronic device structures, new materials, and other technology improvements.

The electron spin transport functional block 510 provides information such as transfer functionality. That is, the spin transport phenomenon provides a technique to transfer spin information (e.g., stored as P or AP state) from one magnet to another. The electron spin transport functional block 510 configured to simulate behavior of electrons flowing through the multi-layered stack 326, including the RL 320, the thin insulator layer 350, and the $FL_1$ 360. In the depicted embodiment, the electron spin transport functional block 510 is configured to receive voltage V 308, magnetization vector M^ 322 of the reference RL block and the magnetization vector $m_1$^ 362 of the $FL_1$ 360 as inputs and provide spin current $I_S$ 512 and charge current $I_C$ 514 as outputs. Additional details of implementing the electron spin transport functional block 510 are described with reference to FIG. 6.

The magnet-dynamics functional block group 494 may include a magnet-dynamics functional block 520 and a magnetic coupling functional block 530. The magnet-dynamics functional block 520 relates to how (spin) information is processed and stored in a free magnetic layer, e.g., the free ferromagnetic layer $FL_2$ 380. The magnet-dynamics phenomenon is described by the standard Landau-Lifshitz-Gilbert (LLG) equation, which computes the instantaneous magnetization in the presence of external perturbation such as magnetic fields or spin currents. In the depicted embodiment, the magnet-dynamics functional block 520 is configured to receive magnetic field H 522 and spin current $I_S$ 512 as inputs and calculates instantaneous magnetization m^ 518 as output in real-time and at every instant in time.

The magnetic coupling functional block 530 represents the magnetic coupling or interaction between a pair of magnets (e.g., $FL_1$ 360 and $FL_2$ 380) to be used for exchange and dipolar type coupling. The inputs and outputs to the magnetic coupling functional block 530 are, respectively, the magnetization vectors $m_1$^ 532 and $m_2$^ 534 of the two magnets (e.g., $FL_1$ 360 and $FL_2$ 380) and the two magnetic fields (e.g., $H_{12}$ 536 and $H_{21}$ 538) exerted on each other by the two magnets. The two magnetic fields may also include external magnetic fields on the two magnets. The coupling coefficients (e.g., $K_{12}$ and $K_{21}$) that determine these magnetic fields are computed using the dimensions and material properties of the magnets and they are fixed for a given geometry.

The coupled spin Transport+Magnet-Dynamics (TMD) functional block 498 is an integrated functional block that is configured to fully capture and integrate the spin transport and magnet-dynamic phenomenon occurring concurrently, interactively and in real-time within the active region 328 of a p-MTJ device, e.g., between a reference layer (e.g., RL 320), a tunneling insulator layer (e.g., the insulator layer 350) and the free layers (e.g., $FL_1$ 360 and $FL_2$ 380). Since magnets inject spins and spins turn magnets, (please refer the coupling between Spin Transport functional block 492 and Magnet-dynamics function block 494) the magnet-dynamics phenomenon dynamically changes a magnetization vector of a magnet in response to a spin current injected into the magnet. At the same time, in a concurrent and interactive manner, the spin transport dynamically adjusts the spin current in response to the change in the magnetization vector. In the depicted embodiment, the TMD functional block 498 integrates the interactive coupling between multiple LLG blocks and spin transport block, e.g., between two magnet-dynamic functional blocks 524 and 526 (with block 524 representing the reference magnet layer dynamics and block 526 representing the $FL_1$ 360 layer dynamics) and one spin transport block 510.

The input to the TMD functional block 498 is a total conservative magnetic field H 542, 544 associated with each magnet and the voltage V 308. The total magnetic field H for each magnet may include an externally applied magnetic field, an exchange coupling field component (exclusively for dual free layers) and an internal field component that includes a demagnetization field for individual magnet, an magnetic anisotropy field (for example a PMA field for a p-MTJ device) and a thermal field. The exchange coupling field component represents magnetic field exerted on a first free layer by a second free layer and vice-versa. The TMD functional block 498 output is the charge current $I_C$ 514.

FIG. 6 shows a spin device circuit diagram 600 representing the active region 328 of the stack of a STT-MRAM device 300. Selected functional blocks (e.g., 510, 520, 516, 530, and 498) that are selected from the library of functional blocks are assembled in a configurable manner (or sequence) to form the spin device circuit 600, where the configurable manner replicates the physical structure of the active region 328 of the STT-MRAM device 300. Tools and techniques to assemble the selected functional blocks in the configurable manner are defined by a software architecture. In the depicted embodiment, the TMD functional block 498 corresponding to the p-MTJ device that includes the reference layer (e.g., RL 320), the tunneling insulator layer (e.g., the insulator layer 350) and the free layer (e.g., $FL_1$ 360) is coupled to the magnetic coupling block 530 to integrate the magnet-dynamic behavior of the $FL_2$ 380 free layer of the active region 328. Inputs 610 to the spin circuit device diagram 600 include total magnetic field H 612 associated with each magnet of the active region (e.g., RL, $FL_1$ and $FL_2$) and the voltage V 308. Outputs 620 of the spin circuit device diagram 600 include magneto-resistance versus voltage graph to illustrate spin torque induced switching of the STT-MRAM device.

FIG. 7a shows a conductance matrix based modeling approach to implement spin device circuits in SPICE simulation. A 4×4 conductance matrix 720 relates 4-component currents 710 to 4-component voltages (or, potentials) 730 (1 component for charge 732 and 3 components for spin 712) per Equation 700. Spin device circuits which use these 4×4 conductance matrices incorporate all the physics of spin accurately. Thus, each functional block (or a module) of a spin device circuit diagram uses the 4-component voltage (V) and current (I) node and each node is related to other nodes by the 4×4 conductance matrix 720 that may be used for the development of the modular simulation flow for STT-MRAM device.

$$[I]_{4\times1}=[G]_{4\times4}[V]_{4\times1} \qquad \text{Equation 700}$$

The 4-component conductance matrix 720 representation provides a framework to interconnect multiple nodes into a spin circuit diagram representative of the STT-MRAM device. The interconnection framework uses the Non-equilibrium Green's Function (NEGF) formalism in the elastic, phase-coherent transport regime, to develop spin based Landaüer formulas for spin tunneling involving such 4×4 conductances for RL/Insulator/$FL_1$ interface. Transport inside bulk RL, $FL_1$, NM and $FL_2$ are calculated using 4-component Valet-Fert (VF) equation. These conductances analytically satisfy universal sum rules as well as the spin generalized Onsager's reciprocity relations and can be represented in a generic 4-component circuit to be used in Spice based simulators.

The functional blocks (or the modules) are represented as generalized spin device circuits to assemble composite STT devices with a one-to-one correspondence between the physical structure and its spin device circuit representation. These spin device circuits are then simulated using standard circuit solvers such as SPICE or MATLOG, accounting for magnetization dynamics and spin-transport self-consistently, which may be a relevant consideration to capture the spin-transfer-torque (STT) effect. 'Self-consistently' as described herein are the only solutions to the laws of physics that can occur locally if they are globally self-consistent. Each conductance matrix node has 4 components: one for the charge information and three components for the spin information corresponding to the x, y, and z directions.

Figure 7B:
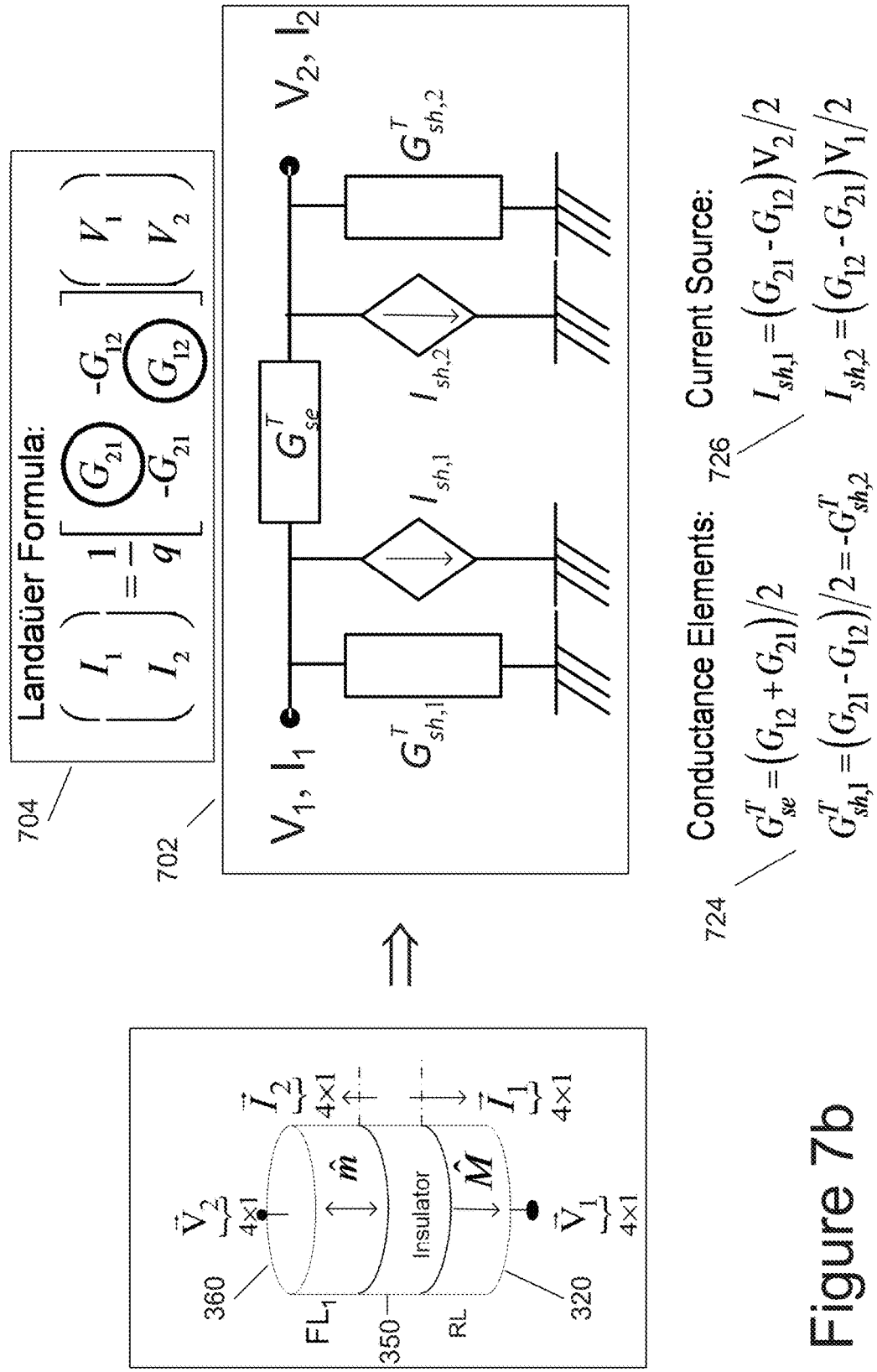
FIGS. 7b-7h show conductance matrix based implementation of selected functional blocks to simulate a STT-MRAM device and FIG. 7i shows a software architecture of Active region of p-MTJ.

FIG. 7b shows a $RL/insulator/FL_1$ spin circuit module 702 configured to simulate electron spin transport phenomenon between the RL 320, the thin insulator layer 350, and the $FL_1$ 360. The $RL/insulator/FL_1$ spin circuit module is configured to use a Landaüer formula 704 to determine a $G^T$ series conductance matrix and $G^T$ shunt conductance matrix. Specifically, the Landaüer formula shown in Equation 704 is used to compute the 4×1 current matrices $I_1$ and $I_2$ as a function of the 4×4 conductance matrix elements and the 4×1 voltage matrices $V_1$ and $V_2$. $G_{12}$ and $G_{21}$ may be calculated using quantum transport formalism based on NEGF.

$$\begin{pmatrix} I_1 \\ I_2 \end{pmatrix} = \frac{1}{q}\begin{bmatrix} G_{21} & -G_{12} \\ -G_{21} & G_{12} \end{bmatrix}\begin{pmatrix} V_1 \\ V_2 \end{pmatrix} \quad \text{Equation 704}$$

The conductances $G_{12}$ and $G_{21}$ are given by the following formulae shown in Equations 706, 708 that are analytically derived from non-equilibrium Green's function (NEGF) formalism:

where $G_0$: base conductance with RL and $FL_1$ orthogonal to each other e.g., $M \cdot m_1 = 0$ $P_1$: polarization of RL/insulator interface (calculated using Ab-initio based DFT model)

$P_2$: polarization of insulator/$FL_1$ interface (calculated using Ab-initio based DFT model)

$b_1$: Perpendicular spin mixing conductance for RL $b_2$: Perpendicular spin mixing conductance for $FL_1$ Assuming spin current in the $RL/insulator/FL_1$ due to the charge voltage as $I_S = I_{SM} \hat{M} + I_{Sm} \hat{m}_1 + I_{S\perp}(\hat{M} \times \hat{m}_1)$, the parameters $G_0$, $P_1$, $P_2$, $b_1$, and $b_2$ (assuming $b_1 = b_2 = b$ for symmetric MTJ devices) are calculated using the first column of the conductance matrices per Equations 712, 714, 716, 718, and 722:

$$\begin{bmatrix} I \\ I_{SM} \\ I_{Sm_1} \\ I_{S\perp} \end{bmatrix} = \frac{1}{q}\int dk_\parallel \int dE\, G_0 \begin{bmatrix} (1 + P_1 P_2 \hat{M} \cdot \hat{m}_1)(f_1 - f_2) \\ P_1(f_1 - f_2) \\ P_2(f_1 - f_2) \\ -b(P_1 f_1 + P_2 f_2) \end{bmatrix} \quad \text{Equation 712}$$

$$G_0(V) = \frac{I_{\hat{M} \cdot \hat{m}_1 = 0}}{\int dk_\parallel \int dE} \quad \text{with} \quad \text{Equation 714}$$

$$P_1(V) = \frac{1}{G_0}\frac{I_{SM}}{\int dk_\parallel \int dE(f_1 - f_2)} \quad \text{Equation 716}$$

$$P_2(V) = \frac{1}{G_0}\frac{I_{Sm}}{\int dk_\parallel \int dE(f_1 - f_2)} \quad \text{Equation 718}$$

$$G_{12} = G_0 \begin{array}{c} \\ c \\ \hat{M} \\ \hat{m}_1 \\ M \times m_1 \end{array}\begin{array}{cccc} c & \hat{M} & \hat{m}_1 & \hat{M} \times \hat{m}_1 \\ \begin{bmatrix} 1 + P_1 P_2 \hat{M} \cdot \hat{m}_1 & P_1 & P_2 & 0 \\ P_1 & \dfrac{1 - P_1 P_2 \hat{M} \cdot \hat{m}_1}{|\hat{M} \times \hat{m}_1|^2} & P_1 P_2 - \dfrac{(1 - P_1 P_2 \hat{M} \cdot \hat{m}_1)\hat{M} \cdot \hat{m}_1}{|\hat{M} \times \hat{m}_1|^2} & b_1 \dfrac{\hat{M} \cdot \hat{m}_1}{|\hat{M} \times \hat{m}_1|^2} \\ P_2 & \dfrac{P_1 P_2 \hat{M} \cdot \hat{m}_1}{|\hat{M} \times \hat{m}_1|^2} & \dfrac{1 - P_1 P_2 \hat{M} \cdot \hat{m}_1}{|\hat{M} \times \hat{m}_1|^2} & -\dfrac{b_1}{|\hat{M} \times \hat{m}_1|^2} \\ b_1 P_2 & -b_1\dfrac{\hat{M} \cdot \hat{m}_1}{|\hat{M} \times \hat{m}_1|^2} & \dfrac{b_1}{|\hat{M} \times \hat{m}_1|^2} & \dfrac{1 - P_1 P_2 \hat{M} \cdot \hat{m}_1}{|\hat{M} \times \hat{m}_1|^2} \end{bmatrix} \end{array} \quad \text{Equation 706}$$

$$G_{21} = G_0 \begin{array}{c} \\ c \\ \hat{M} \\ \hat{m}_1 \\ M \times m_1 \end{array}\begin{array}{cccc} c & \hat{M} & \hat{m}_1 & \hat{M} \times \hat{m}_1 \\ \begin{bmatrix} 1 + P_1 P_2 \hat{M} \cdot \hat{m}_1 & P_1 & P_2 & 0 \\ P_1 & \dfrac{1 - P_1 P_2 \hat{M} \cdot \hat{m}_1}{|\hat{M} \times \hat{m}_1|^2} & \dfrac{P_1 P_2 \hat{M} \cdot \hat{m}_1}{|\hat{M} \times \hat{m}_1|^2} & \dfrac{b_2}{|\hat{M} \times \hat{m}_1|^2} \\ P_2 & P_1 P_2 - \dfrac{(1 - P_1 P_2 \hat{M} \cdot \hat{m}_1)\hat{M} \cdot \hat{m}_1}{|\hat{M} \times \hat{m}_1|^2} & \dfrac{1 - P_1 P_2 \hat{M} \cdot \hat{m}_1}{|\hat{M} \times \hat{m}_1|^2} & -b_2 \dfrac{\hat{M} \cdot \hat{m}_1}{|\hat{M} \times \hat{m}_1|^2} \\ -b_1 P_2 & -\dfrac{b_2}{|\hat{M} \times \hat{m}_1|^2} & b_2 \dfrac{\hat{M} \cdot \hat{m}_1}{|\hat{M} \times \hat{m}_1|^2} & \dfrac{1 - P_1 P_2 \hat{M} \cdot \hat{m}_1}{|\hat{M} \times \hat{m}_1|^2} \end{bmatrix} \end{array} \quad \text{Equation 708}$$

$$b(V) = -\frac{1}{G_0} \frac{I_{S\perp}}{\int dk_\parallel \int dE(P_1 f_1 + P_2 f_2)}$$  Equation 722

I, $I_{SM}$, $I_{Sm}$, and $I_{S\perp}$ are calculated using the current operator based on non-equilibrium Green's function (NEGF) formalism. $f_1$ and $f_2$ are the fermi functions of the ferromagnetic contacts (RL and $FL_1$), E is the energy level and $k_\parallel$ is the transverse wave vector.

Values of $G_{12}$ and $G_{21}$ may be used to calculate the $G_{se}^T$ series and the $G_{sh,1}^T$ and $G_{sh,2}^T$ using Equation 724 and $I_{sh,1}$ and $I_{sh,2}$ currents using Equation 726.

$$G_{se}^T = (G_{12} + G_{21})/2$$

$$G_{sh,1}^T = (G_{21} - G_{12})/2 = -G_{sh,2}^T$$  Equation 724

$$I_{sh,1} = (G_{21} - G_{12})v_2/2$$

$$I_{sh,2} = (G_{12} - G_{21})v_1/2$$  Equation 726

Figure 7C:
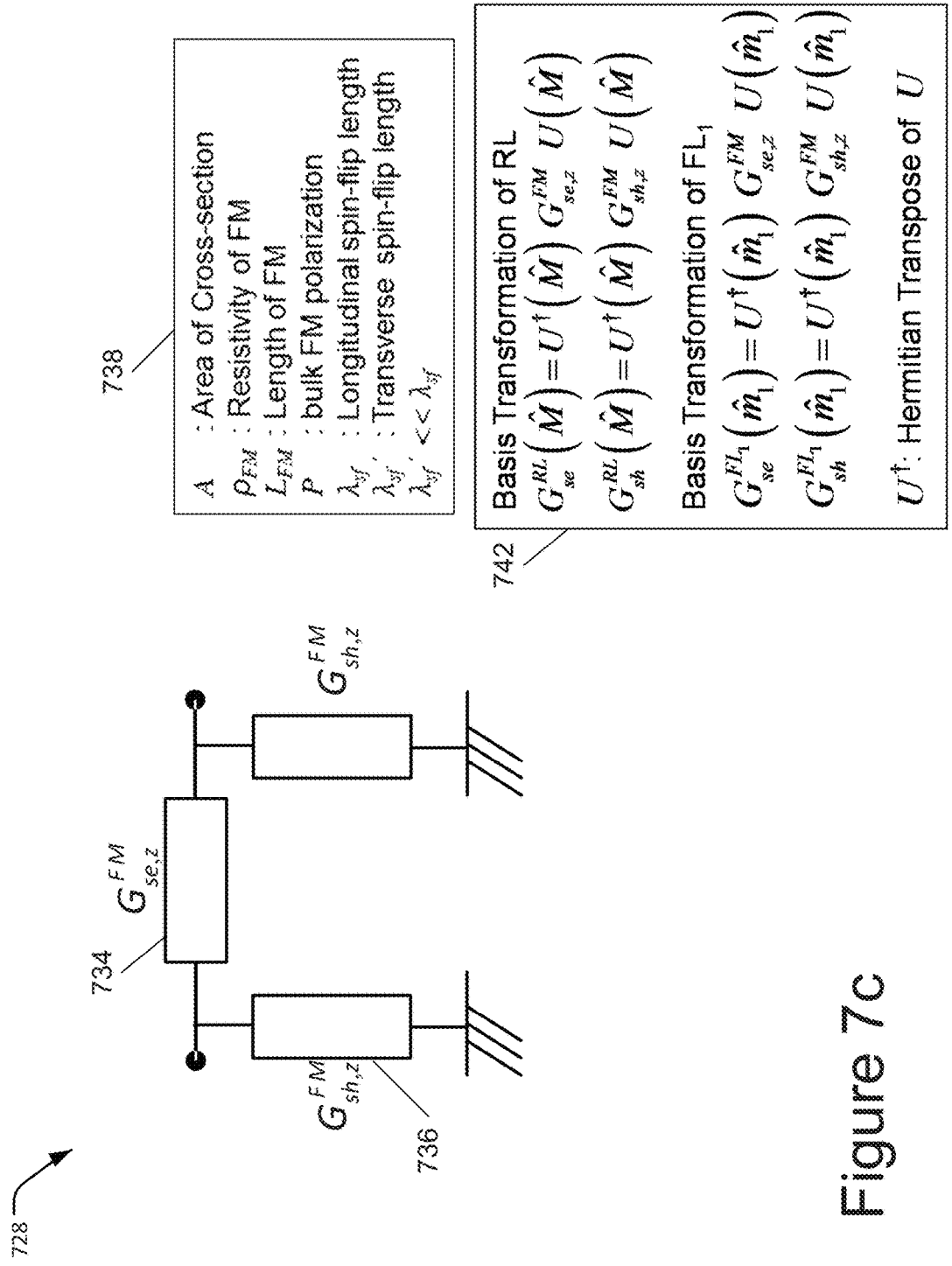

FIG. 7c shows a conductance matrix based implementation of a ferromagnetic (FM) functional block. The 4×4 conductance matrix is configured to simulate electron spin transport phenomenon across bulk ferromagnets (e.g., RL, $FL_1$ and $FL_2$). The FM functional block that is a FM spin circuit node 728 is configured as a reciprocal Π network having a $G_{se,2}^{FM}$ series conductance 734 and $G_{sh,z}^{FM}$ shunt conductance 736. The $G_{se,z}^{FM}$ conductance element of the 4×4 conductance matrix is computed using Equation 732 and $G_{sh,2}^{FM}$ conductance is computed using Equation 734. In addition, $G_{se,2}^{FM}$ series conductance matrix and $G_{sh,z}^{FM}$ shunt conductance are calculated by analytically solving spin diffusion equation and represented as the function of the parameters 738 A, $\rho_{FM}$, P, $L_{FM}$, $\lambda_{sf}$ and $\lambda sf'$.

$$G_{se,2}^{FM} = \frac{A\rho_{FM}}{L_{FM}} \begin{array}{c} c \\ z \\ x \\ y \end{array} \begin{bmatrix} c & z & x & y \\ 1 & 0 & 0 & 0 \\ 0 & P^2 + \alpha\operatorname{csch}\left(\frac{L}{\lambda_{sf}}\right) & 0 & 0 \\ 0 & 0 & 0 & 0 \\ 0 & 0 & 0 & 0 \end{bmatrix}$$  Equation 732

$$G_{sh,2}^{FM} = \frac{A\rho_{FM}}{L_{FM}}$$  Equation 734

$$\begin{array}{c} c \\ z \\ x \\ y \end{array} \begin{bmatrix} c & z & x & y \\ 1 & 0 & 0 & 0 \\ 0 & \alpha\tanh\left(\frac{L}{\lambda_{sf}}\right) & 0 & 0 \\ 0 & 0 & \left(\frac{L}{\lambda'_{sf}}\right)\tanh\left(\frac{L}{2\lambda'_{sf}}\right) & 0 \\ 0 & 0 & 0 & \left(\frac{L}{\lambda'_{sf}}\right)\tanh\left(\frac{L}{2\lambda'_{sf}}\right) \end{bmatrix}$$

with $\alpha = (1 - P^2)\left(\frac{L}{\lambda_{sf}}\right)$ and
A: Area of Cross-section
$\rho_{FM}$: Resistivity of FM
$L_{FM}$: Length of FM
P: bulk FM polarization
$\lambda_{sf}$: Longitudinal spin-flip length
$\lambda'_{sf}$: Transverse spin-flip length
$\lambda'_{sf} \ll \lambda_{sf}$ The conductance matrices involving ferromagnets have been described in Equations 732 and 734 are expressed in the [c, z, x, y] basis with the spin quantization axis in +z direction. Since the $G_{se,z}^{FM}$ series and the $G_{sh,z}^{FM}$ conductance matrix are dependent on a magnetization vector of the FM, these conductance matrices may be expressed as a function of an arbitrary direction, (θ, φ) through a basis transformation. The transformation matrix U may be calculated by using Rodrigues formula 742 shown for the RL 320 and $FL_1$ 360 magnets.

Figure 7D:
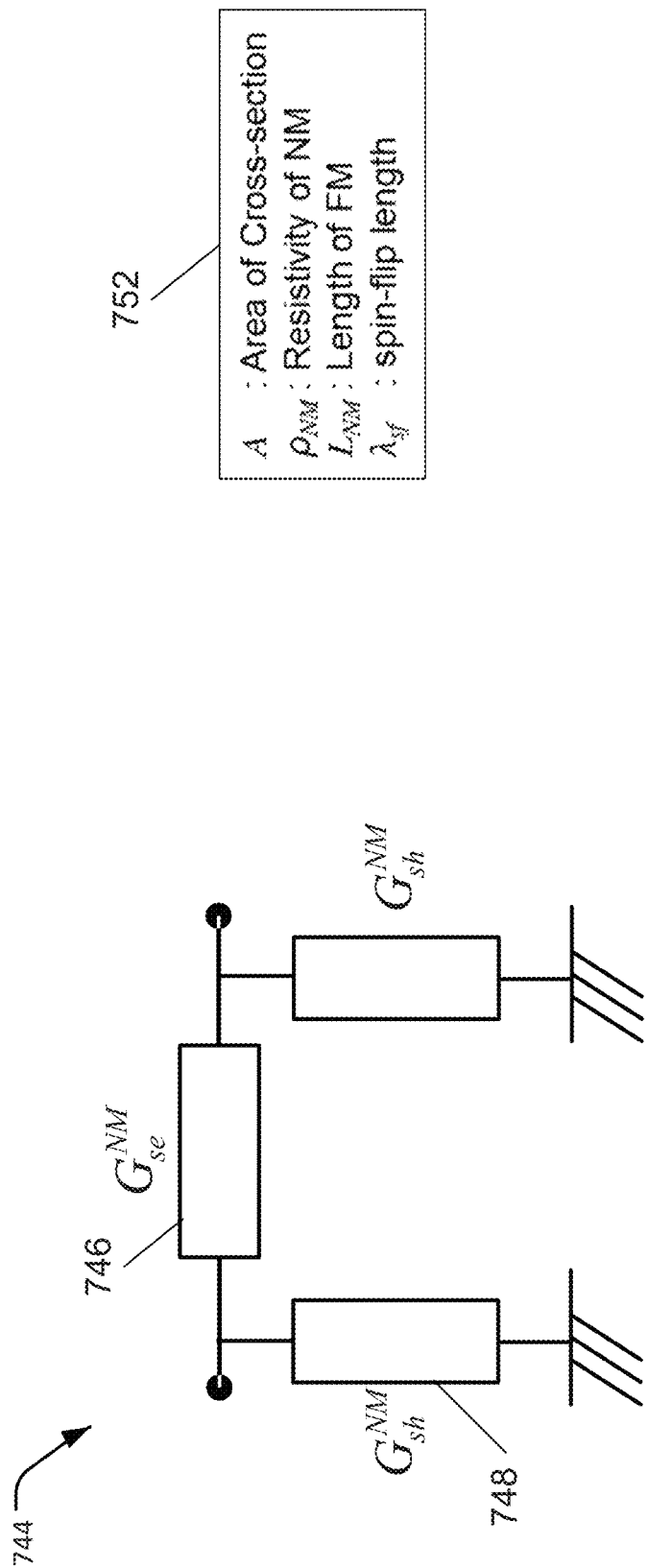

FIG. 7d shows a conductance matrix based implementation of a non-magnetic material (NM) functional block. The 4×4 conductance matrix is configured to simulate electron spin transport phenomenon across the NM functional block (e.g., NM). The NM functional block that is a NM spin circuit 'node' 744 is configured as a reciprocal Π network having $G_{se}^{NM}$ series conductance 746 and $G_{sh}^{NM}$ shunt conductance 748. The $G_{se}^{NM}$ conductance 746 element of the 4×4 conductance matrix is computed using Equation 742 and $G_{sh}^{NM}$ conductance 748 is computed using Equation 744. In addition, $G_{se}^{NM}$ series conductance and $G_{sh}^{NM}$ shunt conductance are calculated by analytically solving spin diffusion equation and represented as the function of parameters 752 [A, $\rho_{NM}$, $L_{NM}$, and $\lambda_{sf}$].

$$G_{se}^{NM} = \frac{A\rho_{NM}}{L_{NM}} \begin{array}{c} c \\ z \\ x \\ y \end{array} \begin{bmatrix} c & z & x & y \\ 1 & 0 & 0 & 0 \\ 0 & \beta & 0 & 0 \\ 0 & 0 & \beta & 0 \\ 0 & 0 & 0 & \beta \end{bmatrix}$$  Equation 742

-continued $$G_{ch}^{NM} = \frac{A\rho_{FM}}{L_{FM}}$$

Figure 7E:
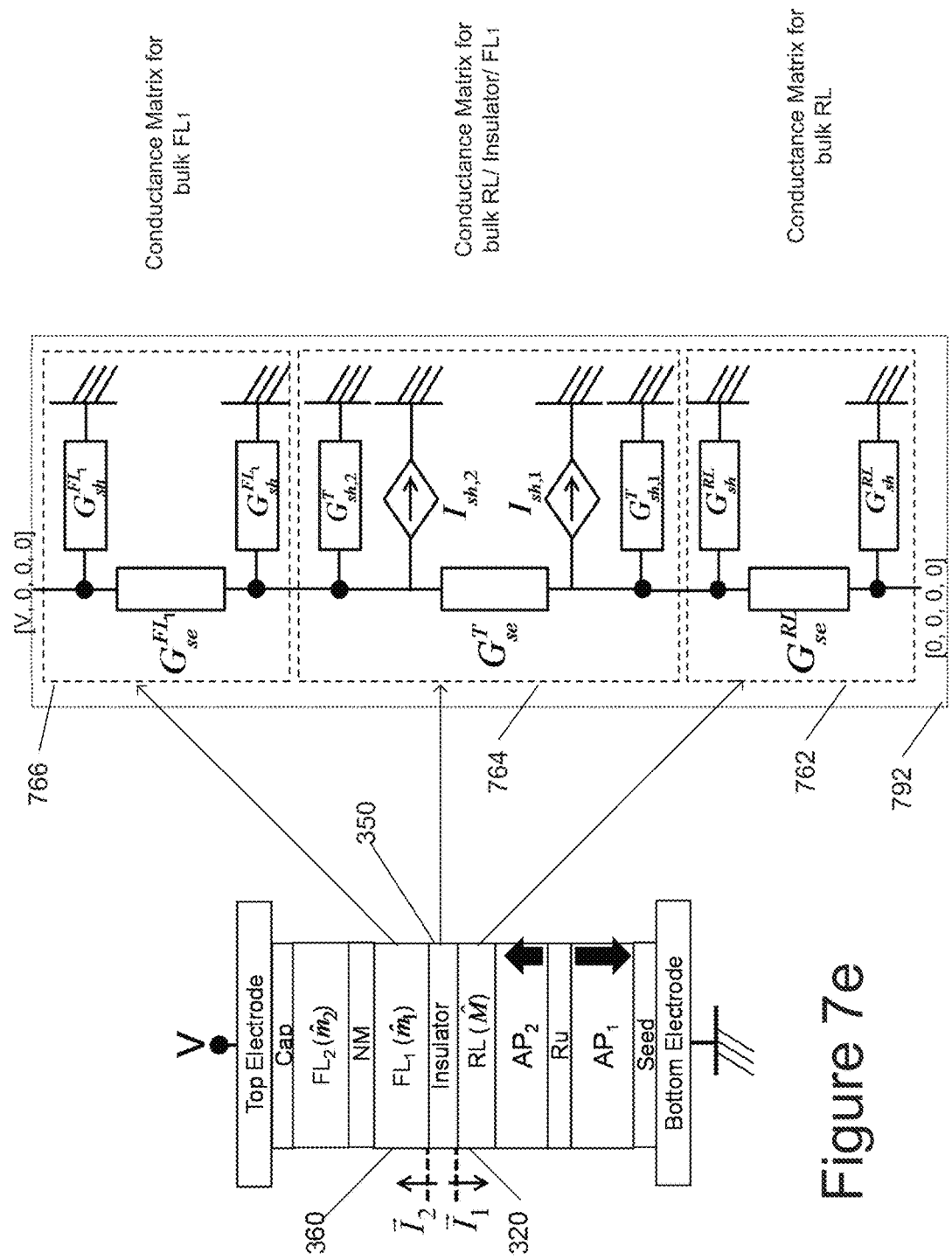

Equation 744

$$\begin{array}{c|cccc} & c & z & x & y \\ \hline c & 1 & 0 & 0 & 0 \\ z & 0 & \left(\frac{L}{\lambda_{sf}}\right)\tanh\left(\frac{L}{2\lambda_{sf}}\right) & 0 & 0 \\ x & 0 & 0 & \left(\frac{L}{\lambda_{sf}}\right)\tanh\left(\frac{L}{2\lambda_{sf}}\right) & 0 \\ y & 0 & 0 & 0 & \left(\frac{L}{\lambda_{sf}}\right)\tanh\left(\frac{L}{2\lambda_{sf}}\right) \end{array},$$

with $\beta = \left(\frac{L}{\lambda_{sf}}\right)\text{cosech}\left(\frac{L}{\lambda_{sf}}\right)$ and
A: Area of Cross-section
$\rho_{NM}$: Resistivity of NM
$L_{NM}$: Length of NM
$\lambda_{sf}$: spin-flip length FIG. 7e shows a 1:1 mapping between physical elements of RL/insulator/FL$_1$ multi-layers and equivalent spin circuit to simulate electron spin transport phenomenon. The equivalent spin circuit is implemented with a 4×4 conductance matrix to model the spin transport function. In the depicted embodiment, the selected functional blocks of RL 320, insulator 350, and FL$_1$ 360 are assembled in a configurable manner (e.g., in a concatenated sequence), represented in equivalent 4×4 conductance matrix based modules 762, 764, and 766 respectively to form the equivalent spin device circuit 792. The configurable manner in which the 4×4 conductance matrix nodes are connected replicates the physical structure of the STT-MRAM device 300.

The conductance matrices involving ferromagnets have been described with reference to collinear magnets (e.g., magnetization in +z direction). Since the $G_{se,z}^{FM}$ series and the $G_{sh,z}^{FM}$ conductance matrix are dependent on a magnetization vector of the FM, these conductance matrices may be expressed as a function of an arbitrary direction, $(\theta, \varphi)$ through a basis transformation. The basis transformation matrix U may be calculated by using Rodrigues formula 742.

The basis transformation for non-collinear magnets for RL/insulator/FL$_1$ may be computed using Equation 746, $$G_{se}^{RL}(\hat{M})=U^\dagger(\hat{M})G_{se,z}^{FM}U(\hat{M})$$

$$G_{sh}^{RL}(\hat{M})=U^\dagger(\hat{M})G_{sh,z}^{FM}U(\hat{M}) \quad \text{Equation 746}$$

where $U^\dagger$ is the Hermitian Transpose of U. A similar basis transformation of FL$_1$ and FL$_2$ may be computed using Equations 752, 754

$$G_{se}^{FL1}(\hat{m}_1)=U^\dagger(\hat{m}_1)G_{se,z}^{FM}U(\hat{m}_1)$$

$$G_{sh}^{FL1}(\hat{m}_1)=U^\dagger(\hat{m}_1)G_{sh,z}^{FM}U(\hat{m}_1) \quad \text{Equation 752}$$

$$G_{se}^{FL2}(\hat{m}_2)=U^\dagger(\hat{m}_2)G_{se,z}^{FM}U(\hat{m}_2)$$

$$G_{sh}^{FL2}(\hat{m}_2)=U^\dagger(\hat{m}_2)G_{sh,z}^{FM}U(\hat{m}_2) \quad \text{Equation 754}$$

While simulating the p-MTJ model with the proposed architecture, FL$_1$, FL$_2$, and RL should be in the same basis. Therefore, a basis transformation of either FL$_1$ or FL$_2$ magnetizations to the RL ($\hat{M}$) basis or, RL and FL$_2$ magnetizations to the basis of FL$_1$ ($\hat{m}_1$) or, RL and FL$_1$ magnetization to the basis of FL$_2$ ($\hat{m}_2$) is required.

Figure 7F:
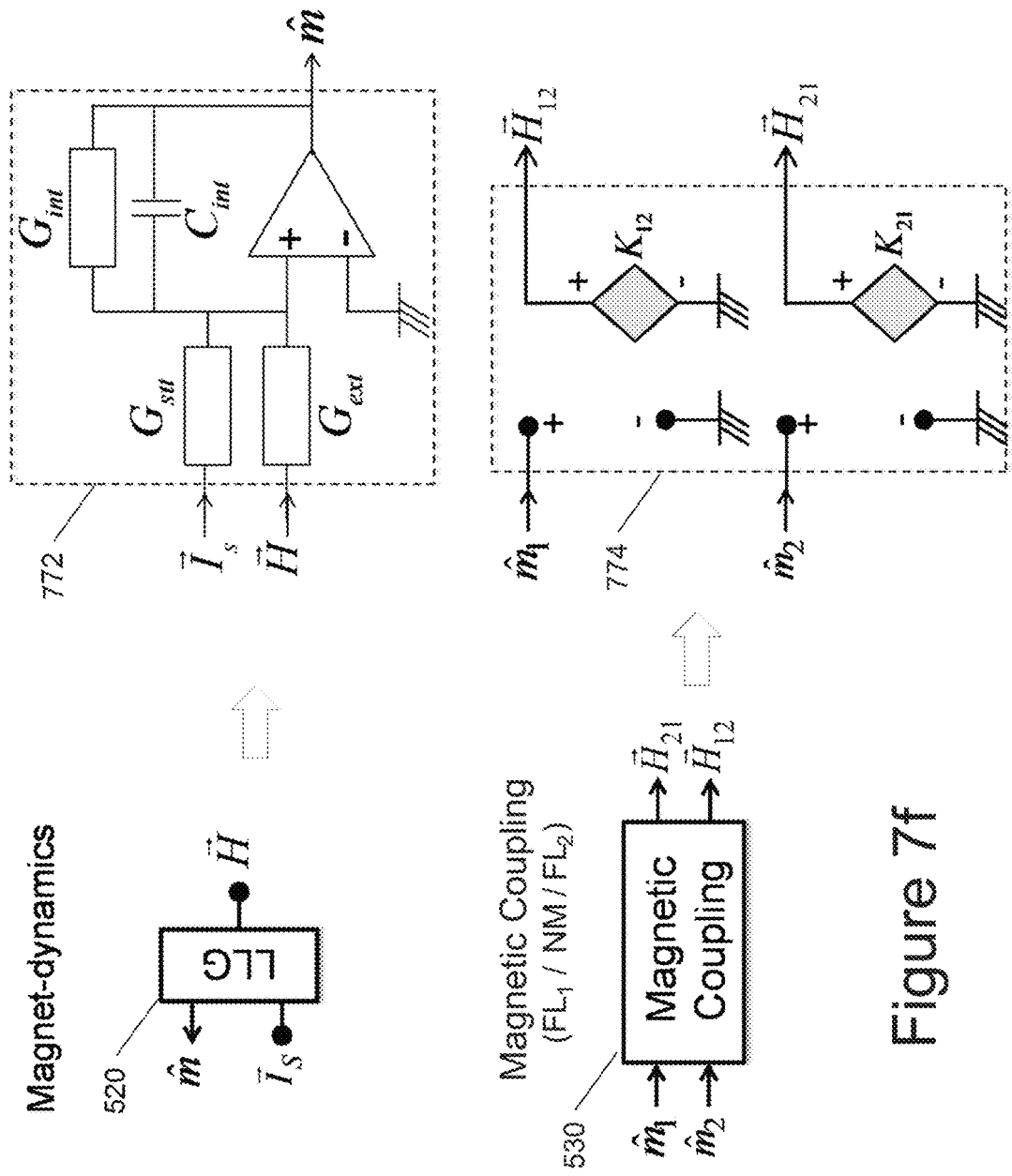

FIG. 7f shows the magnet-dynamics (LLG) functional block 520 and the magnetic coupling functional block 530 implemented as equivalent spin circuit modules 772 and 774 that are represented as 3×3 conductance matrix nodes. The LLG function block is implemented as a LLG spin circuit module 772 having a magnetization vector $\hat{M}$, $\hat{m}_1$ or $\hat{m}_2$ as output in response to receiving I$_S$ and H as inputs. $G_{stt}$ is the 3×3 spin conductance for LLG, $G_{ext}$ is the 3×3 external conductance for LLG, $G_{int}$ is the internal conductance for LLG and $C_{int}$ is 3×3 LLG capacitance representing change in magnetization with time.

The magnetic coupling functional block 530 represents magnetic interaction between a pair of magnets is implemented as the magnetic coupling spin circuit module 774 having magnetization fields H$_{12}$ and H$_{21}$ as output in response to receiving magnetization vectors $\hat{m}_1$ and $\hat{m}_2$ as inputs. The coupling coefficients K$_{12}$ and K$_{21}$ are computed using the dimensions and material properties of the pair of magnets and they are fixed for a given geometry.

Figure 7G:
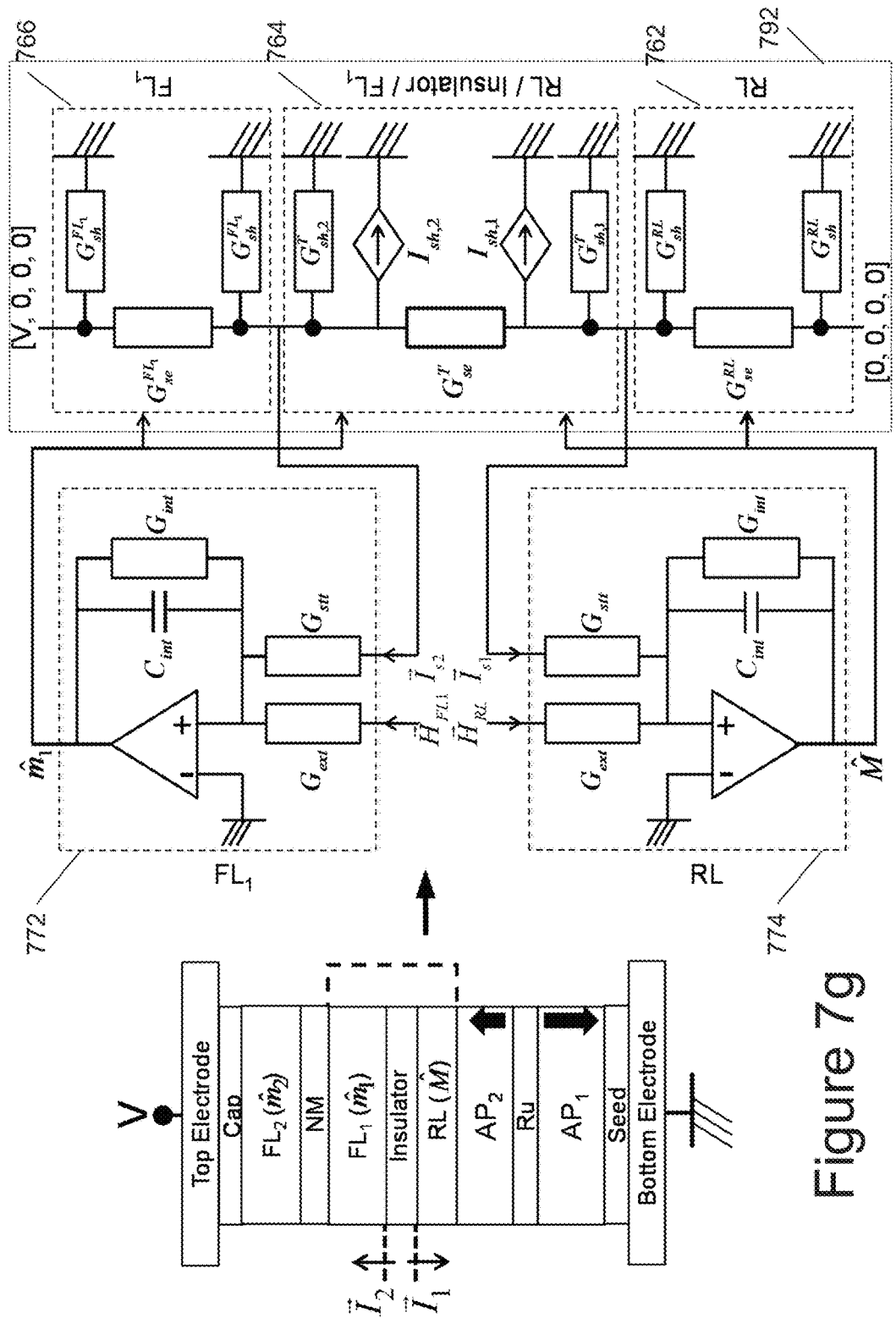

FIG. 7g shows a 1:1 mapping between physical elements of a RL/insulator/FL$_1$ tri-layer structure and equivalent spin circuit to simulate a fully integrated, coupled spin transport and magnet-dynamics phenomenon occurring at the RL/insulator/FL$_1$ tri-layer structure. The connected spin circuit modules 792 (having G$_{RL}$/T/FL$_2$/SE series and the G$_{RL}$/T/FL$_2$/SH conductances) are dependent on the magnetization vector M of the RL spin circuit module 774 and a magnetization vector m$_1$ of the FL$_1$ spin circuit module 772. The magnet-dynamic module for RL 774 and FL$_1$ 772 magnets are configured to generate instantaneous magnetization vectors $\hat{M}$ and $\hat{m}_1$ in response to receiving H$_{RL}$ external field, I$_{S1}$ spin current injected into the RL, H$_{FL1}$ external field, and I$_{S2}$ spin current injected into the FL$_1$ as inputs.

Figure 7H:
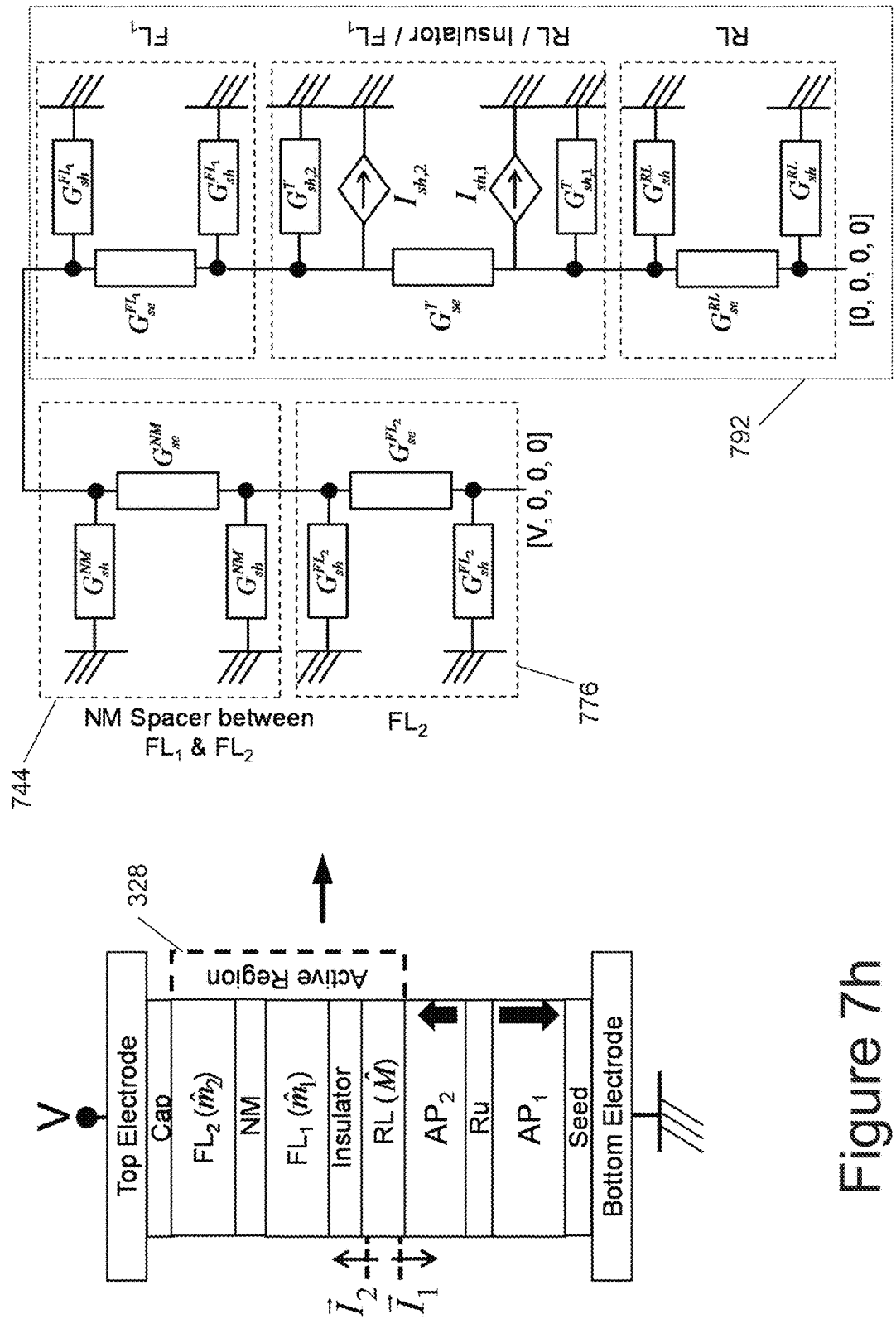

FIG. 7h shows a 1:1 mapping between physical elements of the active region 328 of a STT-MRAM device and equivalent spin circuit to simulate spin transport phenomenon occurring across the active region 328. NM spin circuit module 744 representing the NM functional block and FL$_2$ spin circuit module 776 representing the FM functional block are connected in series with the spin circuit modules 792 to form the equivalent spin circuit for the active region 328.

Figure 7I:
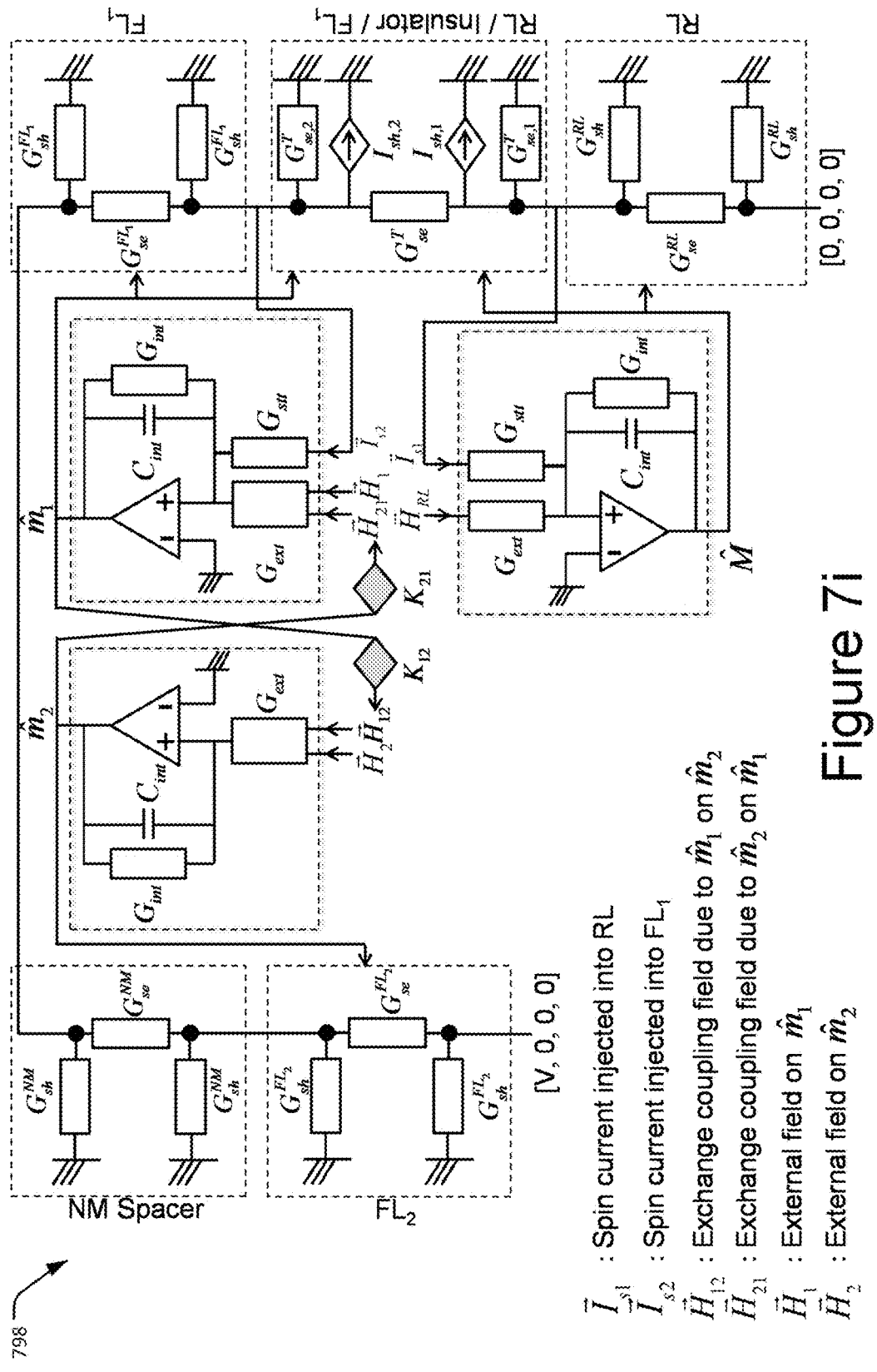

FIG. 7i shows a 1:1 mapping between physical elements of the active region 328 of a STT-MRAM device and equivalent spin circuit 798 to simulate a fully integrated, coupled spin transport and magnet-dynamics phenomenon occurring across the active region 328. The spin device circuit 600 represented as selected functional blocks described with reference to FIG. 6 is functionally identical to the equivalent spin circuit 798 represented as 4×4 conductance matrix nodes.

Figure 8A:
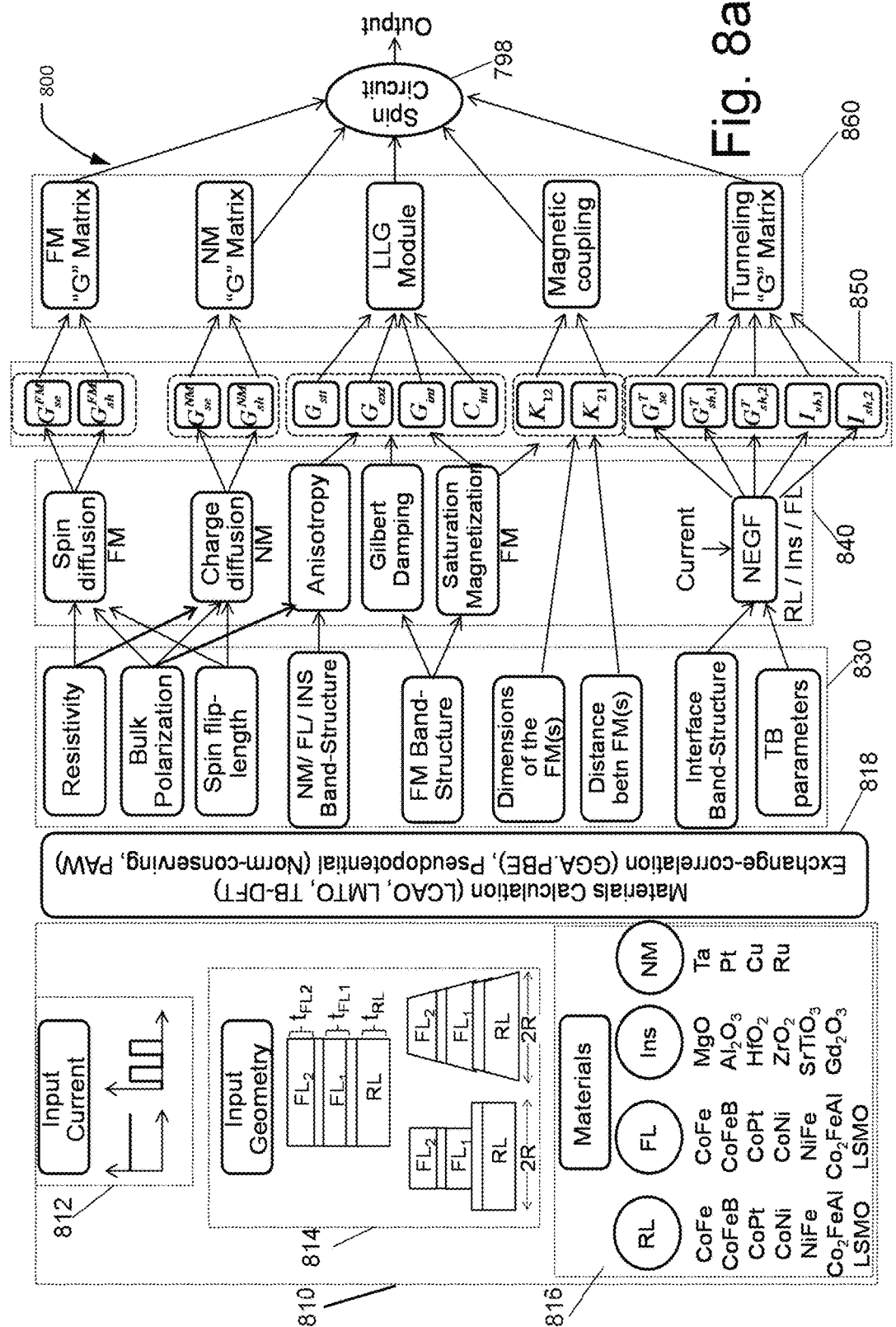
FIG. 8a shows an exemplary process flow diagram to configure a spin circuit model for a STT-MRAM cell.

FIG. 8a shows an exemplary process 800 flow diagram to configure a spin circuit model for a STT-MRAM cell. The simulation framework 402 described with reference to FIG. 4b is used to identify configurable design parameters 810 of the STT-MRAM device 300. The configurable design parameters 810 are provided as input parameters to the spin circuit model. The configurable design parameters 810 may include input current parameters 812, input geometry of the device 814, and materials used 816. Based on the configurable design parameters computations 818 may be performed to calculate primary derived design parameters 830. The computations 818 may include but not limited to Materials Calculation (Linear combination of atomic orbitals (LCAO), linear muffin-tin orbital (LMTO), Tight-binding (TB)-DFT), Exchange (PBE, RPBE, PBES, BLYP, XLYP, PW91, BPW91, BP86, etc.) with correlation (for example local density approximations (LDA), Generalized gradient approximations (GGA), Meta-GGA, hybrid functional), Pseudopotential (Norm-conserving, PAW), etc.

The primary derived parameters 830 may include properties of an individual ferromagnet (FM), an insulator, a non-magnet and a FM/insulator interface such as resistivity (for bulk FM and NM), bulk polarization (of a FM), spin flip-length (of a FM and a NM), and others. Some of the secondary derived design parameters 840 may be calculated from the primary derived design parameters 830. Some of the secondary derived design parameters 840, e.g., the Spin diffusion, Charge diffusion and NEGF blocks may not be derived from the primary derived parameters 830 but may be derived from or based on material properties. For example, Gilbert damping factor and saturation magnetization may be computed based on FM band structure. The secondary derived design parameters are used to compute conductance matrix elements 850 such as series and shunt conductances for selected set of functional blocks (or modules) 860 from the library of functional blocks. The selected functional blocks 860 may include multiple magnets and materials, $K_{21}$, $K_{12}$ magnetic coupling factors, $I_{sh,1}$ and $I_{sh,2}$ shunt current sources, and others described with reference to FIGS. 7a through 7i. Each functional block (or a module) is a node that is defined by an equivalent conductance matrix that includes the computed matrix elements 850.

As described with reference to FIG. 6, functional blocks that are selected from the library of functional blocks are assembled in a configurable manner (or sequence) to form the spin device circuit 600, where the configurable manner replicates the physical structure of the active region 328 of the STT-MRAM device. The spin device circuit 600 simulates a fully integrated, coupled spin transport and magnet-dynamics phenomenon occurring across the active region 328 of the STT-MRAM cell. As described with reference to FIG. 7i, the spin device circuit 600 is mapped into the to the equivalent spin circuit 798 represented as 4×4 conductance matrix nodes.

The spin device circuit 798 may be configured to be executed, parsed or processed to generate a set of output parameters in response to receiving a set of input parameters. The set of input parameters may include configurable design parameters 810, primary derived design parameters 830, and secondary derived design parameters 840. The set of output parameters may include voltage, current, resistance, and time values that may be represented in graphical form. Additional details of a computer system that may be used to implement the process 800 is described with reference to FIG. 10.

Figure 8B:
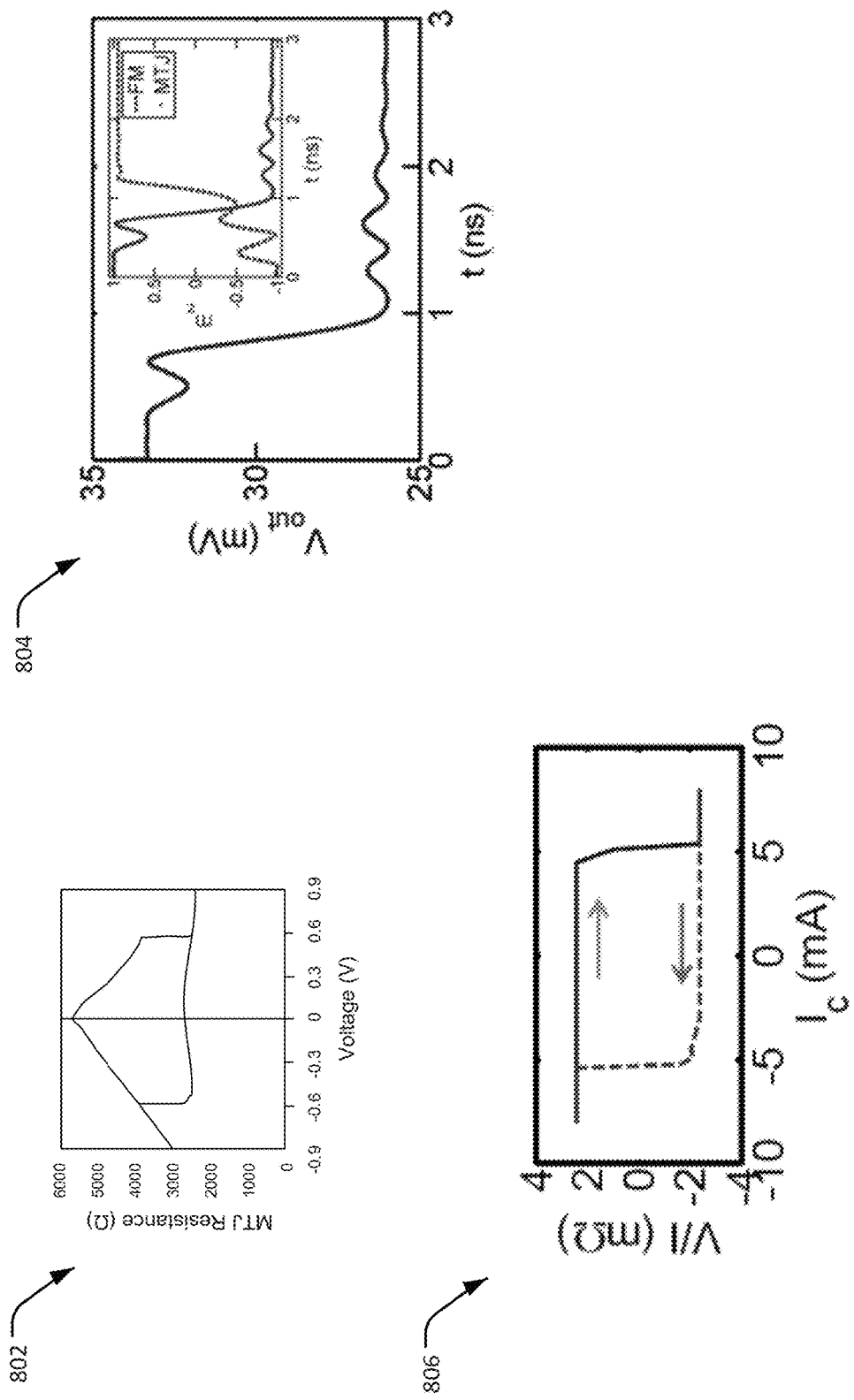
FIGS. 8b-8c illustrate exemplary simulation framework generated graphs that show relationship between voltage, current, resistance, time, geometrical factors, material types and other input or output parameters of interest.
Figure 8C:
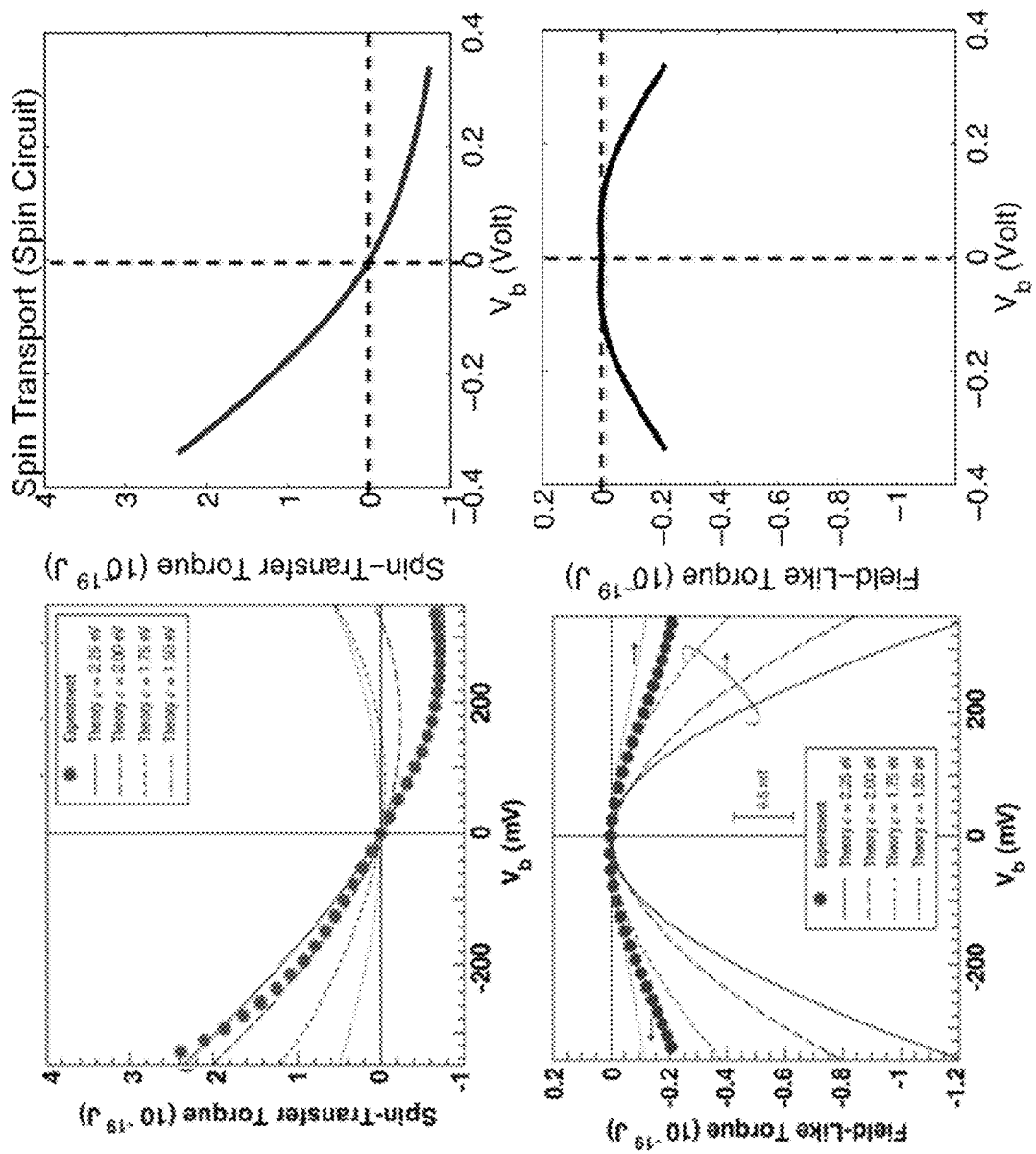

FIGS. 8b-8c illustrate exemplary simulation framework generated graphs 802, 804, 806 and 808 that show relationship between voltage, current, resistance, time, geometrical factors, material types and other input or output parameters of interest. For example, graph 802 illustrates magnetoresistance versus voltage, graph 804 illustrates STT switching characteristics of the MRAM device, graph 806 illustrates hysteresis curve of a memory cell, and graph 808 illustrates 2 STT (Y axis) versus V (X axis) graphs and 2 Field-like Torque (Y axis) versus V (X axis) comparing results obtained from experimental/theoretical data and data generated by the spin circuit device 798. Other suitable types of graphs that show relationship between various input or output parameters of interest may also be useful.

Depending on the choice of (a) Input current profile, (b) Input Geometry parameters and (c) Input materials, the primary design parameters 830 are calculated that are used to calculate the second set of design parameters 840 which are then used to calculate the conductance and capacitance matrices 850 to build the modules 860. The process flow is generally in the forward direction and the spin circuit model may not be useful to back calculate any materials or geometry. As another example, making a change in material used from A to B may be quantified (in terms of performance) by using the spin device circuit 798 to simulate a desired output, e.g., reduction in switching voltage as shown in switching diagram. Additional details of a computer system that may be used to simulate the spin circuit device 798 are described with reference to FIG. 10.

Figure 8D:
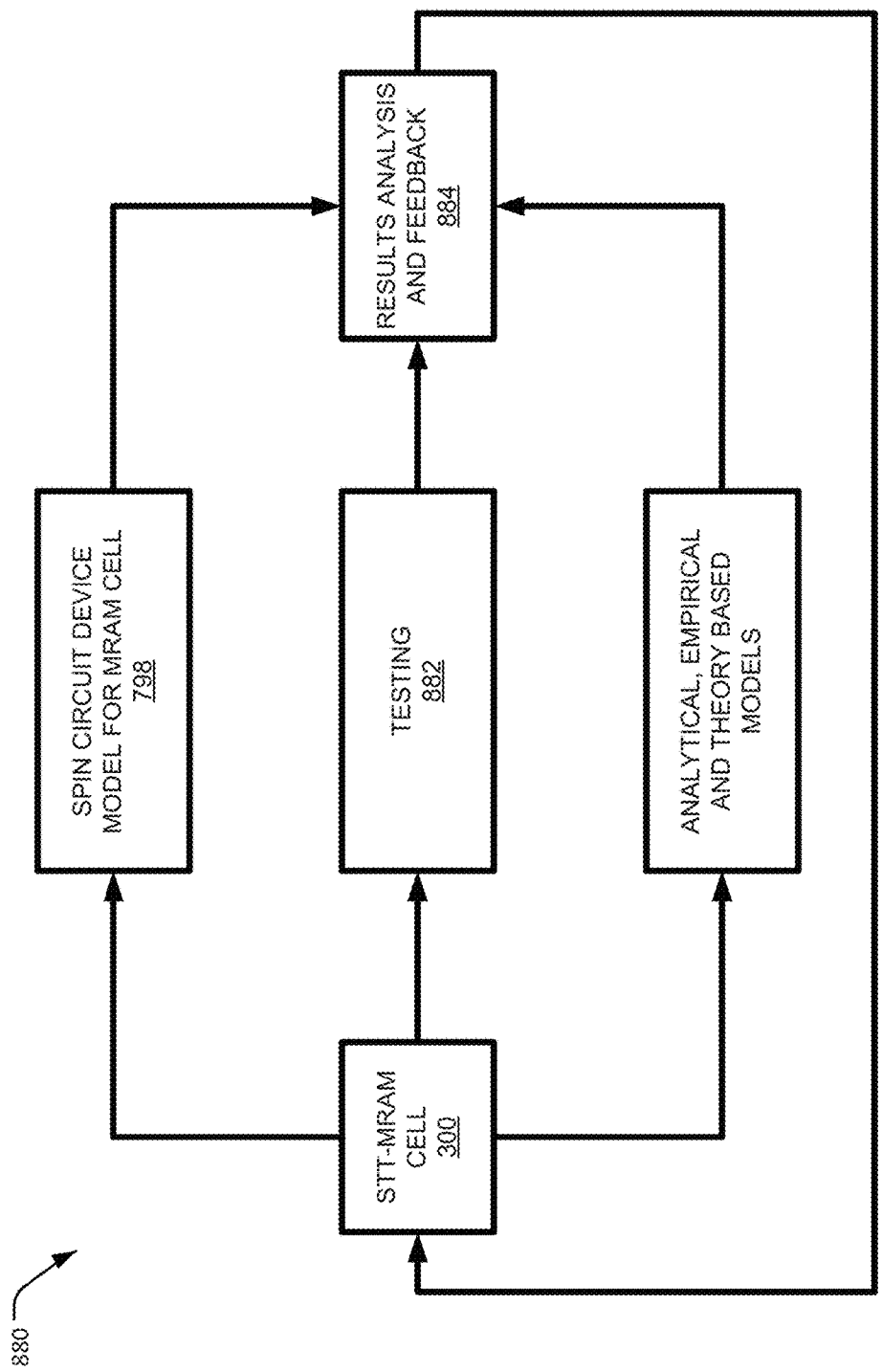

FIG. 8d shows an exemplary iterative process 880 flow diagram to verify, validate and improve the spin circuit model for a STT-MRAM cell 300 described with reference to FIG. 8a. In the depicted embodiment, the spin circuit model 798 for a STT-MRAM cell may be validated by performing testing 882 of the STT-MRAM cell device. The spin circuit model for a STT-MRAM cell may also be compared with other simulation tools that may use analytical, empirical, or theory based techniques such as NEGF, scattering, distributed transmission line representation, etc., to describe underlying physical phenomenon. Other types of comparisons may also be useful. It is important to note that unlike existing models, the spin circuit model includes two different categories of transport for example (a) tunneling through insulating barrier and (b) diffusive transport through bulk FM(s) and NM(s) in a single framework. A results analysis and feedback block 884 may be used to compare actual test results with the simulated values obtained from various alternatives to evaluate performance of the spin circuit device model 798. Comparison benchmarks may include model accuracy, error, and others. The spin device circuit model may be improved via feedback path by changing input parameters, changing values of conductance matrix elements 850, etc., of the spin circuit device model 798 to reduce error and improve model accuracy.

Figure 9:
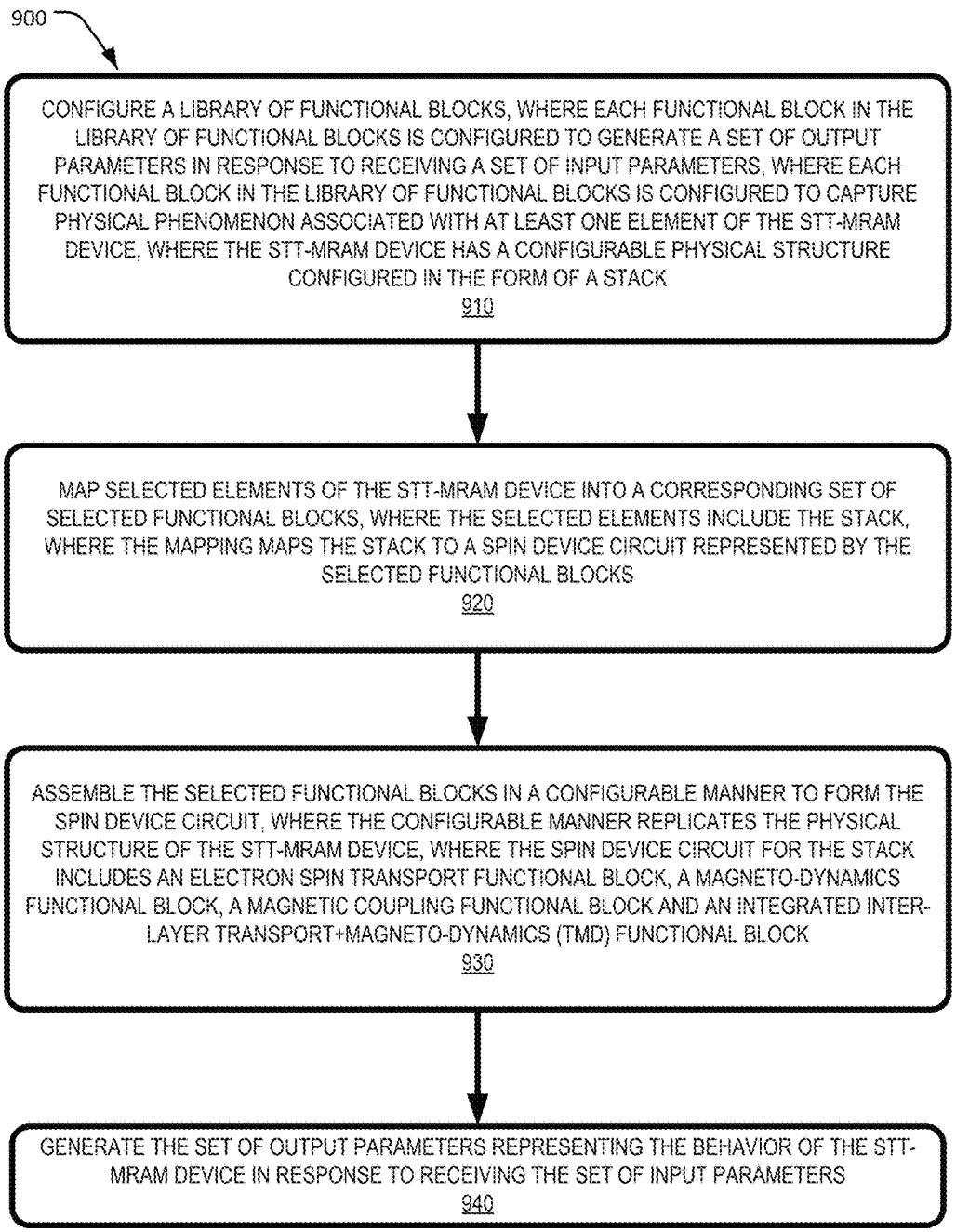
FIG. 9 is a flow diagram illustrating a process to implement techniques described herein to simulate behavior of a STT-MRAM device described with reference to FIGS. 3a-3d, 4a-4b, 5, 6, 7a-7i and 8a-8d.

FIG. 9 is a flow diagram illustrating a process 900 to implement techniques described herein to simulate behavior of a spin transfer torque magnetic random access memory (STT-MRAM) device described with reference to FIGS. 3a through 3d. The process 900 may also be used to simulate behavior of other suitable types of STT-MRAM device. At process 910, a library of functional blocks is configured to include a plurality of functional blocks. Each functional block in the library of functional blocks is configured to generate a set of output parameters in response to receiving a set of input parameters. In addition, each functional block in the library of functional blocks is also configured to capture physical phenomenon associated with at least one element of the STT-MRAM device. The STT-MRAM device has a configurable physical structure configured in the form of a stack. At process 920, selected elements of the STT-MRAM device are mapped into a corresponding set of selected functional blocks. The selected elements of the STT-MRAM device include the stack. The mapping maps the stack to a spin device circuit represented by the selected functional blocks. At process 930, the selected functional blocks are assembled in a configurable manner to form the spin device circuit. The configurable manner replicates the physical structure of the STT-MRAM device. The spin device circuit for the stack includes an electron spin transport functional block, a magnet-dynamics functional block, a magnetic coupling functional block and a coupled interlayer Transport+Magnet-Dynamics (TMD) functional block. At process 940, the set of output parameters that represents the behavior of the STT-MRAM device is generated in response to receiving the set of input parameters. Additional details of a computer system that may be used to implement the process 900 are described with reference to FIG. 10.

Figure 10:
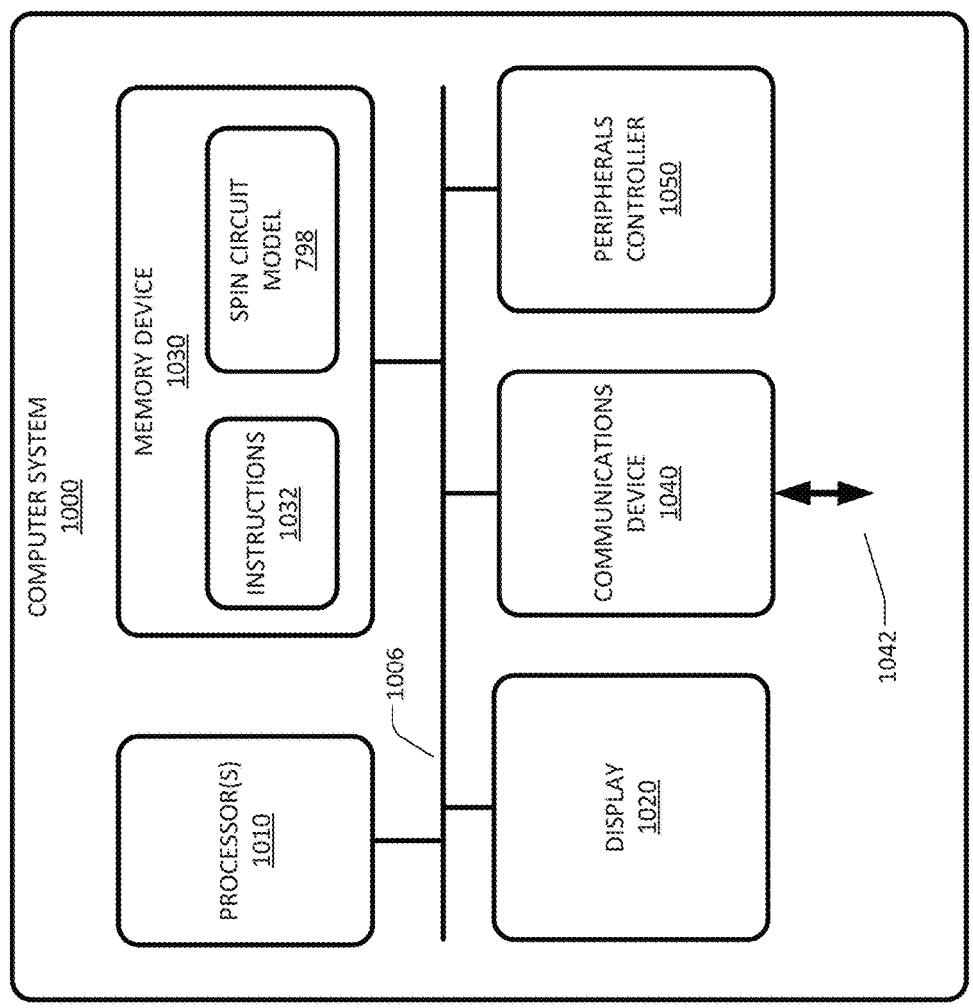
FIG. 10 is a block diagram of a computer system that is configured to perform simulation of behavior and performance of computing devices.

FIG. 10 is a block diagram of a computer system 1000 that is configured to perform simulation of behavior and performance of a computing system. More particularly, users may have a desire to simulate performance and/or behavior of a computing system before incurring significant development time and expenses, or requiring increased investment in capital costs, or without conducting extensive tests to determine feasibility. Examples of such computer systems that may be used to perform simulations may include, but are not limited to, servers, client devices, workstations, desktop devices, a tablet computer, a netbook, a notebook computer, a laptop computer, mobile phone, a cellular phone, a smartphone, a personal digital assistant, a multimedia playback device, a digital music player, a digital video player, a navigational device, a digital camera, a set top device, and the like. Any of these computer systems may be virtualized.

In an implementation, the computer system 1000, includes a processor 1010 coupled to a bus 1006, a memory device 1030 coupled to the processor via the bus 1006, a communications device 1040 coupled to the processor 1010 via the bus 1006, and a peripherals controller 1050 coupled to the processor 1010 via the bus 1006. The communications device 1040 is configured to communicate with other computer systems (not shown) via a communications agent 1042.

A user interaction device may include a display 1020. The peripherals controller 1050 may be used to control peripherals such as a touch screen, a mouse, a trackball, or similar other cursor positioning devices, a hard disk storage device, and others. The display 1020 is configured to provide a graphical user interface for user interaction.

It should be understood that depending on the computing load, more than one processor 1010 may be included in the computer system 1000. The memory device 1030 is operable to store instructions or commands 1032 that are executable by the processor 1010 to perform one or more functions. It should also be understood that the term "computer system" is intended to encompass any device having a processor that is capable of executing program instructions from a memory medium. Various solutions, applications, functions, processes, method(s), programs, agents, and operations described herein may be implemented using the computer system 1000. Any system such as system 1000, framework or any processes or methods such as processes 400, 800, 880, 900 and others as described herein may be implemented using the computer system 1000. In an embodiment, the spin circuit model 798 described with reference to FIGS. 7a-7i and 8a-8d may be stored in the memory device 1030. For example, the processor 1010 is operable to execute the instructions 1032 stored in memory device 1030 for executing the 4×4 conductance matrix corresponding to each node in the spin circuit model 798.

The components of the computer system 1000 may be modules of computer-executable instructions, which are instructions executable on a computer, mobile device, or the processors of such devices. While shown here as agents, the components may be embodied as hardware, firmware, software, or any combination thereof. The techniques described herein may be performed, as a whole or in part, by hardware, software, firmware, or some combination thereof.

In various implementations the program instructions 1032 may be implemented in various ways, including procedure-based techniques, component-based techniques, object-oriented techniques, rule-based techniques, among others. The program instructions 1032 can be stored on the memory 1030 or one or more non-transitory computer-readable medium for use by or in connection with any computer-related system or method. In an embodiment, the memory 1030 may use one or more STT-MRAM cells described with reference to FIGS. 3a-3d. Although the memory 1030 is shown separate from the processor 1010 in some applications the memory may be internal to the processor (e.g., cache or register).

A non-transitory, tangible computer-readable medium is an electronic, magnetic, optical, or other physical device or means that can contain or store a computer program for use by or in connection with a computer-related system, method, process, or procedure. Programs can be embodied in a non-transitory, tangible computer-readable medium for use by or in connection with an instruction execution system, device, component, element, or apparatus, such as a system based on a computer or processor, or other system that can fetch instructions from an instruction memory or storage of any appropriate type. A non-transitory, tangible computer-readable medium can be any structure, device, component, product, or other means that can store, communicate, propagate, or transport the program for use by or in connection with the instruction execution system, apparatus, or device.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The term "techniques," for instance, may refer to one or more devices, apparatuses, systems, methods, articles of manufacture, and/or computer-readable instructions as indicated by the context described herein. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form. Unless the context indicates otherwise, the term "logic" used herein includes hardware, software, firmware, circuitry, logic circuitry, integrated circuitry, other electronic components and/or a combination thereof that is suitable to perform the functions described for that logic.

It is understood that the order in which the processes 400, 800, 880, 900 and others, or method described herein is illustrative and not intended to be construed as a limitation, and any number of the described process blocks can be combined in any order to implement the process, method or alternate method. Additionally, individual blocks may be deleted from the process without departing from the spirit and scope of the subject matter described herein.

The embodiments as described above result in advantages. As shown in FIGS. 4a and 4b, the simulation framework 402 provides a quantitative foundation for exploring magnetic switching devices such as MTJ(s) that may be readily integrated with software like MATLAB, SPICE, Verilog, etc., and can take input from Atomistic simulation tools (e.g., QuantumWise, VASP, Quantum Espresso as well as Micromagnetics tools (e.g., OOMMF, Magnum.fe, or FastMag).

The simulation framework 402 provides a unique multiphysics framework combining tunneling through insulating barrier and spin diffusion through ferromagnetic layers coupled with multi-magnet dynamics with modularity. A modular approach enables simulation of complex interfaces between individual pieces of p-MTJ structure and provides tools and techniques to couple the modules into a spin circuit. The simulation framework 402 describes magnet-dynamics of multiple magnets talking to each other via spin transport (RL/Insulator/FL$_1$) and exchange coupling (FL$_1$/NM/FL$_2$), thus capturing multiple physics in an unified simulation flow with modularity. Modularity means at will individual components that may be separated from each other. The existing spin circuit modules may easily be improved and new modules can be added according to experimental specification of materials.

Since the library of functional blocks is extensible, new functional blocks may be added as new materials and phenomena are discovered. The spin circuit formalism incorporates (a) materials, (b) quantum transport, (c) spin diffusion, and (d) magnet-dynamics in a single simulation framework and provides an advantage over some existing simulators that only provide a coupled solution of finite element Micromagnetics and spin diffusion based transport phenomenon.

Although the simulation framework describes simulation of a STT-MRAM cell, it is understood that the modular simulation tools and techniques described herein may be extended to simulate advanced STT-MRAM devices like (a) Spin Hall based RAM as well as (b) Voltage assisted MRAM that have potential to replace conventional STT-MRAM devices.

Described herein are significantly improved computer-implemented tools and techniques for simulating spintronic devices beyond the generic simulation framework like SPICE. Spin transfer torque based magnetic random access memory (STT-MRAM) devices show a promising future for high-density and low-power memory system applications that may potentially replace main memory system (e.g., CMOS based DRAM devices) of a computer. The significantly improved computer-implemented tools and techniques for simulating spintronic devices disclosed herein are significantly more than an abstract idea since they include novel elements that provide a unique multiple physics simulation framework combining quantum transport (tunneling) through insulating barrier and diffusive transport (spin diffusion) through bulk ferromagnetic layers coupled with multi-magnet dynamics with modularity. This simulation framework is not possible with generic simulation tools since the generic tools only provide a coupled solution of finite element Micromagnetics and spin diffusion based transport phenomenon. Other elements and/or other phenomenon occurring within a MTJ device such as (a) materials, (b) tunneling, (c) spin diffusion, and (d) magnet-dynamics are not captured simultaneously by the generic simulation tools.

The models for STT-MRAM arrays and circuits may be developed following the spin device circuit, thereby directly effecting the performance of arrays and/or, circuits by changing the input parameters, e.g., (a) input current, (b) input geometry and (iii) input materials. In a similar way, Process Develop Kit (PDK) of STT-MRAM device may be developed using the reciprocal H network developed for individual material (FM, NM) or phenomena (Tunneling, spin diffusion and magnet-dynamics).

The present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method for forming a spin transfer torque magnetic random access memory (STT-MRAM) device, the method comprising:
configuring a spin device model for the STT-MRAM device, comprising:
configuring a library of functional blocks, wherein each functional block in the library of functional blocks is configured to generate a set of output parameters in response to receiving a set of input parameters, wherein each functional block in the library of functional blocks is configured to capture physical phenomenon associated with at least one element of the STT-MRAM device, wherein the STT-MRAM device has a configurable physical structure configured in the form of a stack,
mapping selected elements of the STT-MRAM device into a corresponding set of selected functional blocks, wherein the selected elements include the stack, wherein the mapping maps the stack to the spin device circuit represented by the selected functional blocks,
assembling the selected functional blocks in a configurable manner to form the spin device circuit, wherein the configurable manner replicates the physical structure of the STT-MRAM device, wherein the spin device circuit for the stack includes an electron spin transport functional block, a magnet-dynamics functional block, a magnetic coupling functional block and an coupled inter-layer Transport+Magnet-Dynamics (TMD) functional block, and generating the set of output parameters representing the behavior of the STT-MRAM device in response to receiving the set of input parameters; and forming the STT-MRAM device in an optimized configurable manner based on the set of output parameters generated.

2. The method of claim 1, wherein selected ones of the library of functional blocks are configured to receive material parameters in the set of input parameters, wherein the material parameters are configured to include Perpendicular Magnetic Anisotropy (PMA), thermal coefficient, demagnetization field coefficient, magnetic coupling coefficients and Gilbert damping parameter.

3. The method of claim 1, wherein the stack is configured to include an active region, wherein the active region includes a reference layer (RL), a thin insulator layer, a first free magnetic layer ($FL_1$) disposed above the thin insulator layer, a non-magnetic metal (NM) layer and a second free magnetic layer ($FL_2$).

4. The method of claim 3, wherein the electron spin transport functional block is configured to simulate behavior of electrons flowing through a multi-layer interface of the stack, the multi-layer interface including the RL, the thin insulator layer, and the $FL_1$.

5. The method of claim 3, wherein the magnet-dynamics functional block is configured to simulate dynamic interactions between magnetic layers, the magnetic layers including the $FL_1$, $FL_2$ and RL.

6. The method of claim 3, wherein the magnetic coupling functional block is configured to simulate magnetic exchange coupling phenomenon between the free layers, $FL_1$, and the $FL_2$.

7. The method of claim 3, wherein the coupled inter-layer TMD functional block is configured to simulate integrated electron spin transport through the RL, the thin insulator layer, and the $FL_1$ and magnet-dynamic phenomenon between the RL and the $FL_1$.

8. The method of claim 3, wherein the coupled inter-layer TMD functional block is configured to include an external magnetic field ($H_{RL}$) on the RL, an external magnetic field ($H_{FL1}$) on the $FL_1$, and a voltage (V) coupled to the STT-MRAM device as the set of input parameters and a charge current ($I_C$) as the set of output parameters.

9. The method of claim 3, wherein the coupled inter-layer TMD functional block is benchmarked with Nonequilibrium Green's Function (NEGF) based quantum transport formalism and experiments to validate the behavior.

10. The method of claim 1, wherein selected ones of the library of functional blocks are implemented in Simulation Program with Integrated Circuit Emphasis (SPICE) using a 4-component voltage and current node representation.

11. The method of claim 10, wherein the assembling of the selected functional blocks includes coupling of selected 4×4 conductance matrices corresponding to the selected functional blocks, wherein each one of the selected 4×4 conductance matrices uses the 4-component voltage and current node representation.

12. The method of claim 10, wherein the coupled inter-layer TMD functional block is configured to include:

a RL spin circuit node configured to simulate the electron spin transport phenomenon of the RL, wherein the RL spin circuit node is configured as a reciprocal Π network having a $G_{se}^{RL}$ series conductance matrix and $G_{sh}^{RL}$ shunt conductance matrix, wherein the $G_{se}^{RL}$ series and the $G_{sh}^{RL}$ conductance matrix is dependent on a magnetization vector M of the RL;

a RL/insulator/$FL_1$ spin circuit node configured to simulate electron spin transport phenomenon between the RL, the thin insulator layer, and the $FL_1$, wherein the RL/insulator/$FL_1$ spin circuit node is configured to use a Landaüer formula to determine a GT series conductance matrix and $G^T$ shunt conductance matrix, wherein the $G_{se}^T$ series and the $G_s^T$ shunt conductance matrix is dependent on the magnetization vector M of the RL and a magnetization vector $m_1$ of the $FL_1$, wherein the RL/insulator/$FL_1$ spin circuit node is configured to generate $I_{S1}$ as a spin current injected into the RL and $I_{S2}$ as a spin current injected into the $FL_1$;

a $FL_1$ spin circuit node configured to simulate the electron spin transport phenomenon of the $FL_1$, wherein the $FL_1$ spin circuit node is configured as a reciprocal Π network having a $G_{se}^{FL1}$ series conductance matrix and $G_{sh}^{FL1}$ shunt conductance matrix, wherein the RL spin circuit node, the RL/insulator/$FL_1$ spin circuit node and the $FL_1$ spin circuit node are connected in a cascaded manner;

a $FL_1$/LLG spin circuit module configured to simulate the magnet-dynamics phenomenon of the $FL_1$, wherein the $FL_1$/LLG spin circuit node is configured to generate the magnetization vector $m_1$ in response to an $H_{FL1}$ external field on the $FL_1$ and the $I_{S2}$; and a RL/LLG spin circuit module configured to simulate the magnet-dynamics phenomenon of the RL, wherein the RL/LLG spin circuit node is configured to generate the magnetization vector M in response to an $H_{RL}$ external field on the RL and the $I_{S1}$.

13. The method of claim 10, wherein the selected functional blocks are configured to receive the set of input parameters comprising voltage V, PMA due to magnets RL, $FL_1$ and $FL_2$, exchange coupling field exerted on $FL_1$ by $FL_2$ and on $FL_2$ by $FL_1$, and internal magnetization fields in the FL, $FL_1$ and $FL_2$.

14. A computer system operable to simulate behavior of a memory cell for optimizing design parameters for designing and manufacturing the memory cell, the computer system comprising:

a hardware processor; and logic instructions stored on computer readable storage media and executable by the hardware processor to cause the hardware processor to perform:

configuring a library of functional blocks, wherein each functional block in the library of functional blocks is configured to generate a set of output parameters in response to receiving a set of input design parameters, wherein each functional block in the library of functional blocks is configured to capture physical phenomenon associated with at least one element of a spin transfer torque magnetic random access memory (STT-MRAM) device, wherein the STT-MRAM device has a configurable physical structure configured in the form of a stack, mapping selected elements of the STT-MRAM device into a corresponding set of selected functional blocks, wherein the selected elements include the stack, wherein the mapping maps the stack to a spin device circuit represented by the selected functional blocks, assembling the selected functional blocks in a configurable manner to form the spin device circuit, wherein the configurable manner replicates the physical structure of the STT-MRAM device, wherein the spin device circuit for the stack includes an electron spin transport functional block, a magnet-dynamics functional block, a magnetic coupling functional block and a coupled inter-layer Transport+Magnet-Dynamics (TMD) functional block, generating the set of output parameters representing the behavior of the STT-MRAM device in response to receiving the set of input design parameters, and manufacturing the STT-MRAM device based on the output parameters by a fabrication plant.

15. The computer system of claim 14, wherein selected ones of the library of functional blocks are configured to receive material parameters in the set of input parameters, wherein the material parameters are configured to include Perpendicular Magnetic Anisotropy (PMA), thermal coefficient, demagnetization field coefficient, and Gilbert damping parameter.

16. The computer system of claim 14, wherein the stack is configured to include an active region, wherein the active region includes a reference layer (RL), a thin insulator layer, a first free magnetic layer ($FL_1$) disposed above the thin insulator layer, a non-magnetic metal (NM) layer and a second free magnetic layer ($FL_2$).

17. The computer system of claim 16, wherein the electron spin transport functional block is configured to simulate behavior of electrons flowing through a multi-layer interface of the stack, the multi-layer interface including the RL, the thin insulator layer, and the $FL_1$.

18. The computer system of claim 16, wherein the magnet-dynamics functional block is configured to simulate dynamic interactions between magnetic layers, the magnetic layers including the $FL_1$, $FL_2$ and RL.

19. The computer system of claim 16, wherein selected ones of the library of functional blocks are implemented in Simulation Program with Integrated Circuit Emphasis (SPICE) using a 4-component voltage and current node representation.

20. One or more non-transitory computer-readable storage media storing instructions that, when executed by one or more processors, cause the one or more processors to perform acts to design and manufacture a spin transfer torque magnetic random access memory (STT-MRAM) device comprising:

configuring a library of functional blocks, wherein each functional block in the library of functional blocks is configured to generate a set of output parameters in response to receiving a set of input design parameters, wherein each functional block in the library of functional blocks is configured to capture physical phenomenon associated with at least one element of the STT-MRAM device, wherein the STT-MRAM device has a configurable physical structure configured in the form of a stack;

mapping selected elements of the STT-MRAM device into a corresponding set of selected functional blocks, wherein the selected elements include the stack, wherein the mapping maps the stack to a spin device circuit represented by the selected functional blocks;

assembling the selected functional blocks in a configurable manner to form the spin device circuit, wherein the configurable manner replicates the physical structure of the STT-MRAM device, wherein the spin device circuit for the stack includes an electron spin transport functional block, a magnet-dynamics functional block, a magnetic coupling functional block and a coupled inter-layer Transport+Magnet-Dynamics (TMD) functional block;

generating the set of output parameters representing the behavior of the STT-MRAM device in response to receiving the set of input design parameters, and manufacturing the STT-MRAM device based on the output parameters by a fabrication plant.

\* \* \* \* \*

UNITED STATES PATENT AND TRADEMARK OFFICE
CERTIFICATE OF CORRECTION

PATENT NO. : 9,997,225 B2
APPLICATION NO. : 14/963264
DATED : June 12, 2018
INVENTOR(S) : Deepanjan Datta, Bhagawan Sahu and Francis Benistant It is certified that error appears in the above-identified patent and that said Letters Patent is hereby corrected as shown below:

In the Specification

Column 4

Line 49, replace "RP" with -- $R_P$ --.

Column 5

Line 7, replace "RP" with -- $R_P$ --.

Columns 11-12

Equation 706, replace "  "

Signed and Sealed this
Twenty-third Day of October, 2018

Andrei Iancu
*Director of the United States Patent and Trademark Office*

CERTIFICATE OF CORRECTION (continued)
U.S. Pat. No. 9,997,225 B2

$$G_{12} = G_0 \begin{array}{c} c \\ \hat{M} \\ \hat{m}_1 \\ \hat{M} \times \hat{m}_1 \end{array} \begin{bmatrix} \overset{c}{1+P_1P_2\hat{M}.\hat{m}_1} & \overset{\hat{M}}{P_1} & \overset{\hat{m}_1}{P_2} & \overset{\hat{M} \times \hat{m}_1}{0} \\ P_1 & \dfrac{1-P_1P_2\hat{M}.\hat{m}_1}{|\hat{M}\times\hat{m}_1|^2} & P_1P_2 - \dfrac{(1-P_1P_2\hat{M}.\hat{m}_1)\hat{M}.\hat{m}_1}{|\hat{M}\times\hat{m}_1|^2} & b_1\dfrac{\hat{M}.\hat{m}_1}{|\hat{M}\times\hat{m}_1|^2} \\ P_2 & \dfrac{P_1P_2-\hat{M}.\hat{m}_1}{|\hat{M}\times\hat{m}_1|^2} & \dfrac{1-P_1P_2\hat{M}.\hat{m}_1}{|\hat{M}\times\hat{m}_1|^2} & -\dfrac{b_1}{|\hat{M}\times\hat{m}_1|^2} \\ b_1P_2 & -b_1\dfrac{\hat{M}.\hat{m}_1}{|\hat{M}\times\hat{m}_1|^2} & \dfrac{b_1}{|\hat{M}\times\hat{m}_1|^2} & \dfrac{1-P_1P_2\hat{M}.\hat{m}_1}{|\hat{M}\times\hat{m}_1|^2} \end{bmatrix}$$

with -- --.

Equation 708, replace "

$$G_{21} = G_0 \begin{array}{c} c \\ \hat{M} \\ \hat{m}_1 \\ M \times m_1 \end{array} \begin{bmatrix} \overset{c}{1+P_1P_2\hat{M}\cdot\hat{m}_1} & \overset{\hat{M}}{P_1} & \overset{\hat{m}_1}{P_2} & \overset{\hat{M}\times\hat{m}_1}{0} \\ P_1 & \dfrac{1-P_1P_2\hat{M}\cdot\hat{m}_1}{|\hat{M}\times\hat{m}_1|^2} & \dfrac{P_1P_2\hat{M}\cdot\hat{m}_1}{|\hat{M}\times\hat{m}_1|^2} & \dfrac{b_2}{|\hat{M}\times\hat{m}_1|^2} \\ P_2 & P_1P_2 - \dfrac{(1-P_1P_2\hat{M}\cdot\hat{m}_1)\hat{M}\cdot\hat{m}_1}{|\hat{M}\times\hat{m}_1|^2} & \dfrac{1-P_1P_2\hat{M}\cdot\hat{m}_1}{|\hat{M}\times\hat{m}_1|^2} & -b_2\dfrac{\hat{M}\cdot\hat{m}_1}{|\hat{M}\times\hat{m}_1|^2} \\ -b_1P_2 & -\dfrac{b_2}{|\hat{M}\times\hat{m}_1|^2} & b_2\dfrac{\hat{M}\cdot\hat{m}_1}{|\hat{M}\times\hat{m}_1|^2} & \dfrac{1-P_1P_2\hat{M}\cdot\hat{m}_1}{|\hat{M}\times\hat{m}_1|^2} \end{bmatrix}$$

"

$$G_{21} = G_0 \begin{array}{c} c \\ \hat{M} \\ \hat{m}_1 \\ \hat{M} \times \hat{m}_1 \end{array} \begin{bmatrix} \overset{c}{1+P_1P_2\hat{M}.\hat{m}_1} & \overset{\hat{M}}{P_1} & \overset{\hat{m}_1}{P_2} & \overset{\hat{M}\times\hat{m}_1}{0} \\ P_1 & \dfrac{1-P_1P_2\hat{M}.\hat{m}_1}{|\hat{M}\times\hat{m}_1|^2} & \dfrac{P_1P_2-\hat{M}.\hat{m}_1}{|\hat{M}\times\hat{m}_1|^2} & \dfrac{b_2}{|\hat{M}\times\hat{m}_1|^2} \\ P_2 & P_1P_2 - \dfrac{(1-P_1P_2\hat{M}.\hat{m}_1)\hat{M}.\hat{m}_1}{|\hat{M}\times\hat{m}_1|^2} & \dfrac{1-P_1P_2\hat{M}.\hat{m}_1}{|\hat{M}\times\hat{m}_1|^2} & -b_2\dfrac{\hat{M}.\hat{m}_1}{|\hat{M}\times\hat{m}_1|^2} \\ -b_2P_1 & -\dfrac{b_2}{|\hat{M}\times\hat{m}_1|^2} & b_2\dfrac{\hat{M}.\hat{m}_1}{|\hat{M}\times\hat{m}_1|^2} & \dfrac{1-P_1P_2\hat{M}.\hat{m}_1}{|\hat{M}\times\hat{m}_1|^2} \end{bmatrix}$$

with -- --.

Column 12

Equation 714, replace " $G_0(V) = \dfrac{I_{\hat{M}.\hat{m}_1=0}}{\int dk_\| \int dE}$ " with -- with $G_0(V) = \dfrac{I_{\hat{M}.\hat{m}_1=0}}{\int dk_\| \int dE \, (f_1 - f_2)}$ --.

Column 13

Line 35, replace "having a $G_{se,2^{FM}}$ series conductance" with -- having a $G_{se,z}^{FM}$ series conductance --.

CERTIFICATE OF CORRECTION (continued)
U.S. Pat. No. 9,997,225 B2

Line 38, replace "Equation 732 and $G_{sh,2}^{FM}$ conductance" with -- Equation 732 and $G_{sh,z}^{FM}$ series conductance --.

Line 39, "In addition, $G_{se,2}^{FM}$ series conductance matrix" with -- In addition, $G_{se,z}^{FM}$ series conductance matrix --.

Equation 732, replace "
$$G_{se,2}^{FM} = \frac{A\rho_{FM}}{L_{FM}} \begin{array}{c} c \\ z \\ x \\ y \end{array} \begin{bmatrix} \overset{c}{1} & \overset{z}{0} & \overset{x}{0} & \overset{y}{0} \\ 0 & P^2 + \alpha csch\left(\frac{L}{\lambda_{sf}}\right) & 0 & 0 \\ 0 & 0 & 0 & 0 \\ 0 & 0 & 0 & 0 \end{bmatrix}$$
" with $$G_{se,z}^{FM} = \frac{A\rho_{FM}}{L_{FM}} \begin{array}{c} c \\ z \\ x \\ y \end{array} \begin{bmatrix} \overset{c}{1} & \overset{z}{0} & \overset{x}{0} & \overset{y}{0} \\ 0 & P^2 + \alpha csch\left(\frac{L}{\lambda_{sf}}\right) & 0 & 0 \\ 0 & 0 & 0 & 0 \\ 0 & 0 & 0 & 0 \end{bmatrix}$$
--.

Column 14

$$G_{sh,2}^{FM} = \frac{A\rho_{FM}}{L_{FM}}$$

Equation 734, replace "
$$\begin{array}{c} c \\ z \\ x \\ y \end{array} \begin{bmatrix} \overset{c}{1} & \overset{z}{0} & \overset{x}{0} & \overset{y}{0} \\ 0 & \alpha\tanh\left(\frac{L}{\lambda_{sf}}\right) & 0 & 0 \\ 0 & 0 & \left(\frac{L}{\lambda'_{sf}}\right)\tanh\left(\frac{L}{2\lambda'_{sf}}\right) & 0 \\ 0 & 0 & 0 & \left(\frac{L}{\lambda'_{sf}}\right)\tanh\left(\frac{L}{2\lambda'_{sf}}\right) \end{bmatrix}$$
" with $$G_{sh,z}^{FM} = \frac{A\rho_{FM}}{L_{FM}} \begin{array}{c} c \\ z \\ x \\ y \end{array} \begin{bmatrix} \overset{c}{1} & \overset{z}{0} & \overset{x}{0} & \overset{y}{0} \\ 0 & \alpha\tanh\left(\frac{L}{2\lambda_{sf}}\right) & 0 & 0 \\ 0 & 0 & \left(\frac{L}{\lambda'_{sf}}\right)\tanh\left(\frac{L}{2\lambda'_{sf}}\right) & 0 \\ 0 & 0 & 0 & \left(\frac{L}{\lambda'_{sf}}\right)\tanh\left(\frac{L}{2\lambda'_{sf}}\right) \end{bmatrix}$$
--.

Column 15

Equation 744, replace "$G_{ch}^{NM} = \frac{A\rho_{FM}}{L_{FM}} \begin{bmatrix} & c & z & x & y \\ c & 1 & 0 & 0 & 0 \\ z & 0 & \left(\frac{L}{\lambda_{sf}}\right)\tanh\left(\frac{L}{2\lambda_{sf}}\right) & 0 & 0 \\ x & 0 & 0 & \left(\frac{L}{\lambda_{sf}}\right)\tanh\left(\frac{L}{2\lambda_{sf}}\right) & 0 \\ y & 0 & 0 & 0 & \left(\frac{L}{\lambda_{sf}}\right)\tanh\left(\frac{L}{2\lambda_{sf}}\right) \end{bmatrix}$ with $\beta = \left(\frac{L}{\lambda_{sf}}\right)\text{cosech}\left(\frac{L}{\lambda_{sf}}\right)$"

with --
$$G_{ch}^{NM} = \frac{A\rho_{FM}}{L_{FM}} \times \begin{bmatrix} & c & z & x & y \\ c & 1 & 0 & 0 & 0 \\ z & 0 & \left(\frac{L}{\lambda_{sf}}\right)\tanh\left(\frac{L}{2\lambda_{sf}}\right) & 0 & 0 \\ x & 0 & 0 & \left(\frac{L}{\lambda_{sf}}\right)\tanh\left(\frac{L}{2\lambda_{sf}}\right) & 0 \\ y & 0 & 0 & 0 & \left(\frac{L}{\lambda_{sf}}\right)\tanh\left(\frac{L}{2\lambda_{sf}}\right) \end{bmatrix}$$

where $\beta = \left(\frac{L}{\lambda_{sf}}\right)\text{cosech}\left(\frac{L}{\lambda_{sf}}\right)$ --.

Column 22

Line 28, replace "reciprocal H network" with -- reciprocal Π network --.